(12) United States Patent
Kasher et al.

(10) Patent No.: US 9,998,184 B2
(45) Date of Patent: Jun. 12, 2018

(54) EXPLORATORY BEAMFORMING TRAINING TECHNIQUES FOR 60 GHZ DEVICES

(71) Applicant: INTEL IP CORPORATION, Santa Clara, CA (US)

(72) Inventors: Assaf Kasher, Haifa (IL); Tom Harel, Shfaim (IL); Yaniv Kaver, Givatayim (IL); Alexander Sverdlov, Rehovot (IL)

(73) Assignee: Intel Corporation, Santa Clara, CA (US)

( * ) Notice: Subject to any disclaimer, the term of this patent is extended or adjusted under 35 U.S.C. 154(b) by 265 days.

(21) Appl. No.: 14/672,117

(22) Filed: Mar. 28, 2015

(65) Prior Publication Data

US 2016/0285522 A1 Sep. 29, 2016

(51) Int. Cl.
*H04B 7/04* (2017.01)
*H04W 24/02* (2009.01)
*H04B 7/06* (2006.01)

(52) U.S. Cl.
CPC ............ *H04B 7/043* (2013.01); *H04B 7/0617* (2013.01); *H04B 7/0632* (2013.01); *H04W 24/02* (2013.01)

(58) Field of Classification Search
CPC .............................. H04B 7/0632; H04W 24/02
See application file for complete search history.

(56) References Cited

U.S. PATENT DOCUMENTS

| | | | |
|---|---|---|---|
| 2010/0265925 A1* | 10/2010 | Liu | H04B 7/0617 370/336 |
| 2013/0072243 A1 | 3/2013 | Yu et al. | |
| 2013/0215844 A1 | 8/2013 | Seol et al. | |
| 2016/0191132 A1* | 6/2016 | Rajagopal | H04B 7/088 370/329 |
| 2016/0249269 A1* | 8/2016 | Niu | H04W 56/0095 |

FOREIGN PATENT DOCUMENTS

WO     WO 2013/039352 A2 *   3/2013

OTHER PUBLICATIONS

International Search Report and Written Opinion received for PCT Patent Application No. PCT/US2016/024564, dated Jun. 15, 2016, 14 pages.

(Continued)

*Primary Examiner* — Derrick Ferris
*Assistant Examiner* — Kevin Lee
(74) *Attorney, Agent, or Firm* — Patent Capital Group

(57) ABSTRACT

Exploratory beamforming training techniques for 60 GHz devices are described. In one embodiment, for example, an apparatus may comprise a station (STA) comprising logic, at least a portion of which is in hardware, the logic to identify an exploratory link quality associated with an exploratory beamforming configuration for a directionally-beamformed wireless link, determine whether to revert to a previous beamforming configuration for the directionally-beamformed wireless link based on the exploratory link quality, and in response to a determination to revert to the previous beamforming configuration, send a frame comprising a rollback notification for the directionally-beamformed wireless link. Other embodiments are described and claimed.

15 Claims, 13 Drawing Sheets

(56) References Cited

OTHER PUBLICATIONS

"ISO/IEC/IEEE International Standard for Information Technology—Telecommunications and Information Exchange Between Systems—Local and Metropolitan Area Networks, Specific requirements—Part 11: Wireless LAN Medium Access Control (MAC) and Physical Layer (PHY) Specifications Amendment 3: Enhancements", Mar. 14, 2014, pp. 1-250.

"ISO/IEC/IEEE International Standard for Information Technology—Telecommunications and Information Exchange Between Systems—Local and Metropolitan Area Networks, Specific requirements—Part 11: Wireless LAN Medium Access Control (MAC) and Physical Layer (PHY) Specifications Amendment 3: Enhancements", Mar. 14, 2014, pp. 251-450.

"ISO/IEC/IEEE International Standard for Information Technology—Telecommunications and Information Exchange Between Systems—Local and Metropolitan Area Networks, Specific requirements—Part 11: Wireless LAN Medium Access Control (MAC) and Physical Layer (PHY) Specifications Amendment 3: Enhancements", Mar. 14, 2014, pp. 451-648.

* cited by examiner

Storage Medium 1100

*Computer Executable Instructions for 900*

*Computer Executable Instructions for 1000*

EXPLORATORY BEAMFORMING TRAINING TECHNIQUES FOR 60 GHZ DEVICES

TECHNICAL FIELD

Embodiments described herein generally relate to wireless communications between devices in wireless networks.

BACKGROUND

When two 60 GHz-capable devices initially establish a connection with each other, they may perform a beamforming training procedure in order to identify optimal beamforming configurations for the directionally-beamformed links between them. Under some circumstances, an initial beamforming configuration for a given directionally-beamformed link, while providing acceptable link quality, may become suboptimal due to environmental changes that make superior link quality available via different beamforming settings. For example, if an object blocks a direct path between two 60 GHz devices at the time of initial beamforming training, but is subsequently removed, an initial beamforming configuration that uses reflective paths may become suboptimal. The availability of superior link quality in such a case may go undetected if beamforming training is only repeated in response to link quality degradation, because the link quality provided by the initial configuration may not have changed. In order to enable 60 GHz devices to discover link quality improvement opportunities under such circumstances, the beamforming training procedure may be repeated at periodic intervals without regard for current link quality.

However, under some circumstances, it may be possible for a given periodic repetition of the beamforming training procedure to result in the selection of beamforming parameters that actually degrade link quality. For example, changes in the direction of reflection off of an unstable reflector—such as the human body—during or soon after periodic beamforming training may result in sector selections that are inferior to those that were in effect prior to the periodic beamforming training. Link quality degradation in conjunction with periodic beamforming training may also result from various imperfections of the beamforming training protocol and its underlying assumptions with respect to antenna behavior.

BRIEF DESCRIPTION OF THE DRAWINGS

FIG. 11 illustrates an embodiment of a storage medium.

DETAILED DESCRIPTION

Figure 1:
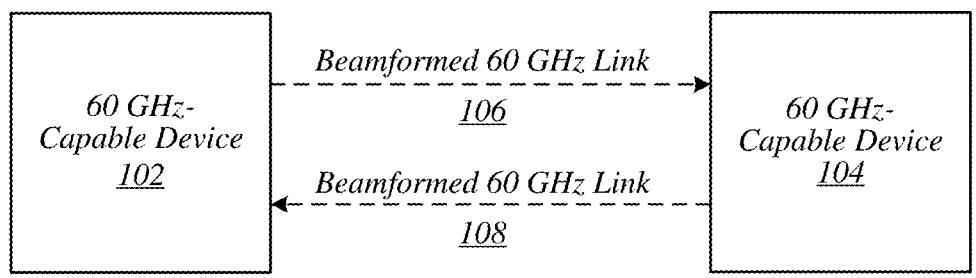
FIG. 1 illustrates an embodiment of a first operating environment.

Various embodiments may be generally directed to exploratory beamforming techniques for 60 GHz devices. In one embodiment, for example, an apparatus may comprise a station (STA) comprising logic, at least a portion of which is in hardware, the logic to identify an exploratory link quality associated with an exploratory beamforming configuration for a directionally-beamformed wireless link, determine whether to revert to a previous beamforming configuration for the directionally-beamformed wireless link based on the exploratory link quality, and in response to a determination to revert to the previous beamforming configuration, send a frame comprising a rollback notification for the directionally-beamformed wireless link. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Various embodiments herein are generally directed to wireless communications systems. Some embodiments are particularly directed to wireless communications over 60 GHz frequencies. Various such embodiments may involve wireless communications performed according to one or more standards for 60 GHz wireless communications. For example, some embodiments may involve wireless communications performed according to one or more Wireless Gigabit Alliance ("WiGig")/Institute of Electrical and Electronics Engineers (IEEE) 802.11ad standards, such as IEEE 802.11ad-2012, including their predecessors, revisions, progeny, and/or variants. Various embodiments may involve wireless communications performed according to one or more "next-generation" 60 GHz ("NG60") wireless local area network (WLAN) communications standards. Some embodiments may involve wireless communications performed according to one or more millimeter-wave (mmWave) wireless communication standards. It is worthy of note that the term "60 GHz," as it is employed in reference to various wireless communications devices, wireless communications frequencies, and wireless communications standards herein, is not intended to specifically denote a frequency of exactly 60 GHz, but rather is intended to generally refer to frequencies in, or near, the 57 GHz to 64 GHz frequency band. The embodiments are not limited in this context.

Various embodiments may additionally or alternatively involve wireless communications according to one or more other wireless communication standards. Some embodiments may involve wireless communications performed according to one or more broadband wireless communication standards. For example, various embodiments may involve wireless communications performed according to one or more 3rd Generation Partnership Project (3GPP), 3GPP Long Term Evolution (LTE), and/or 3GPP LTE-Advanced (LTE-A) technologies and/or standards, including their predecessors, revisions, progeny, and/or variants. Additional examples of broadband wireless communication technologies/standards that may be utilized in some embodiments may include—without limitation—Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS), IEEE 802.16 wireless broadband standards such as IEEE 802.16m and/or IEEE 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1×RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their predecessors, revisions, progeny, and/or variants.

Further examples of wireless communications technologies and/or standards that may be used in various embodiments may include—without limitation—other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11af, and/or IEEE 802.11ah standards, High-Efficiency Wi-Fi standards developed by the IEEE 802.11 High Efficiency WLAN (HEW) Study Group, Wi-Fi Alliance (WFA) wireless communication standards such as Wi-Fi, Wi-Fi Direct, Wi-Fi Direct Services, WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, and/or 3GPP TS 23.682, and/or near-field communication (NFC) standards such as standards developed by the NFC Forum, including any predecessors, revisions, progeny, and/or variants of any of the above. The embodiments are not limited to these examples.

FIG. 1 illustrates an example of an operating environment 100 that may be representative of various embodiments. In operating environment 100, 60 GHz-capable devices 102 and 104 communicate with each other over beamformed 60 GHz links 106 and 108. 60 GHz-capable device 102 sends data to 60 GHz-capable device 104 over beamformed 60 GHz link 106, and receives data from 60 GHz-capable device 104 via beamformed 60 GHz link 108. Likewise, 60 GHz-capable device 104 sends data to 60 GHz-capable device 102 over beamformed 60 GHz link 108, and receives data from 60 GHz-capable device 102 via beamformed 60 GHz link 106. In some embodiments, 60 GHz-capable devices 102 and 104 may comprise wireless communication devices in a wireless network that utilizes wireless channel frequencies of the 60 GHz band. In various embodiments, 60 GHz-capable devices 102 and 104 may communicate with each other according to one or more standards for 60 GHz wireless communications. For example, in some embodiments, 60 GHz-capable devices 102 and 104 may commu-nicate with each other according to one or more protocols and/or procedures defined in IEEE 802.11ad-2012, and/or its predecessors, revisions, progeny, and/or variants. In various such embodiments, 60 GHz-capable devices 102 and 104 may comprise 60 GHz-capable stations (STAs) such as Directional Multi-Gigabit (DMG) stations (STAs). In some such embodiments, one of 60 GHz-capable devices 102 and 104 may operate as a personal basic service set (PBSS) control point/access point (PCP/AP). The embodiments are not limited to these examples.

In some embodiments, 60 GHz-capable devices 102 and 104 may possess directional transmission and reception capabilities, and the exchange of communications over beamformed 60 GHz links 106 and 108 may involve directional transmission and reception. Each directional transmission may generally comprise a transmission that is beamformed in such a way as to be directed towards a selected transmit sector. Likewise, each directional reception may generally comprise a reception that is realized using antenna settings optimized for receiving incoming transmissions from a selected receive sector. In various embodiments, the link qualities of beamformed 60 GHz links 106 and 108 may depend greatly on the transmit sectors selected for transmissions and the receive sectors selected for receptions.

Figure 2:
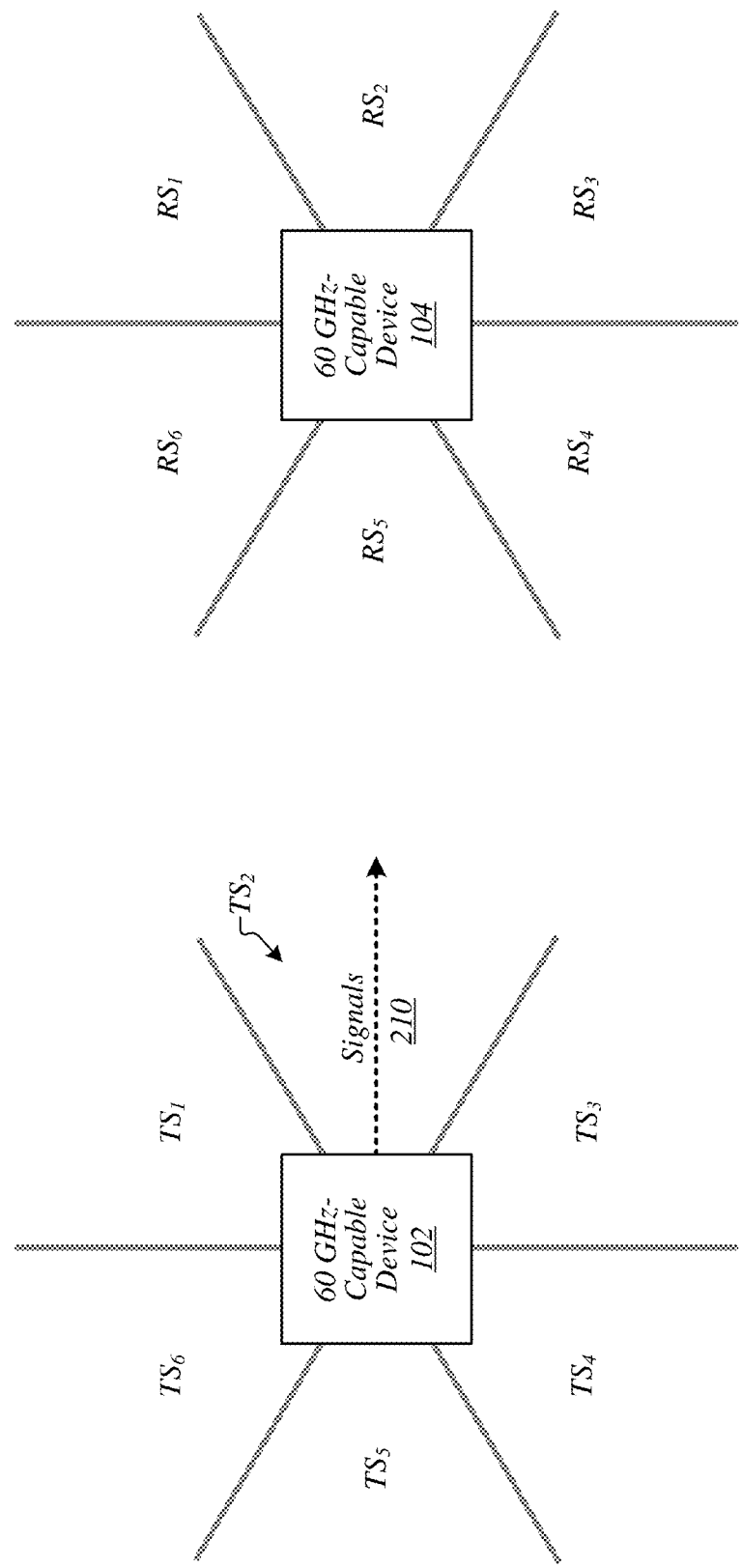
FIG. 2 illustrates an embodiment of a second operating environment.

FIG. 2 illustrates an operating environment 200 that depicts a simple example of the manner in which transmit sector and receive sector selections may affect 60 GHz link quality in some embodiments. In operating environment 200, 60 GHz-capable device 102 is configured to perform each of its directional transmissions towards a respective transmit sector selected from among six transmit sectors $TS_1$-$TS_6$. Likewise, 60 GHz-capable device 104 is configured to perform each of its directional receptions from a respective receive sector selected from among six receive sectors $RS_1$-$RS_6$. In order to send data to 60 GHz-capable device 104, 60 GHz-capable device 102 directionally transmits signals 210 representing that data towards a selected one of transmit sectors $TS_1$-$TS_6$. It is worthy of note that in various embodiments, greater or lesser numbers of transmit sectors and/or receive sectors may be configured for 60 GHz-capable devices 102 and/or 104, and the embodiments are not limited to the example in operating environment 200.

If 60 GHz-capable device 102 transmits signals 210 towards any of transmit sectors TS/and $TS_3$-$TS_6$, such that its transmit radiation pattern is generally directed away from 60 GHz-capable device 104, the energy levels of signals 210 as they are incident upon 60 GHz-capable device 104 may be very low, precluding 60 GHz-capable device 104 from successfully receiving signals 210. On the other hand, if 60 GHz-capable device 102 transmits signals 210 towards transmit sector $TS_2$, signals 210 may arrive at 60 GHz-capable device 104 with high levels of energy. If 60 GHz-capable device 104 is monitoring receive sector $RS_5$ for incoming transmissions at the same time that signals 210 arrive from 60 GHz-capable device 102 with high levels of energy, 60 GHz-capable device 104 may receive signals 210 with high levels of received power, enabling it to successfully obtain the data contained therein. However, if 60 GHz-capable device 104 is monitoring a different receive sector when signals 210 arrive from 60 GHz-capable device 102, then even though signals 210 may arrive with high levels of energy, the power with which 60 GHz-capable device 104 actually receives those signals 210 may be relatively low, potentially preventing 60 GHz-capable device 104 from successfully obtaining the data sent by 60 GHz-capable device 102. The embodiments are not limited in this context.

Returning to FIG. 1, in some embodiments, in order to identify transmit sectors and receive sectors for selection to optimize the link qualities of beamformed 60 GHz links 106 and 108 of FIG. 1, 60 GHz-capable devices 102 and 104 may perform a beamforming training procedure. In various embodiments, 60 GHz-capable devices 102 and 104 may perform the beamforming training procedure in conjunction with establishing beamformed 60 GHz links 106 and 108 when 60 GHz-capable devices 102 and 104 initially connect with each other. In some embodiments, performing the beamforming training procedure at the time of initial connection may provide 60 GHz-capable devices 102 and 104 with relatively high-quality links via which to begin communicating. However, in various embodiments, as time passes, conditions may change in such a way that the transmit sectors and receive sectors identified during the beamforming training procedure are no longer optimal, resulting in degradation of link quality.

Figure 3:
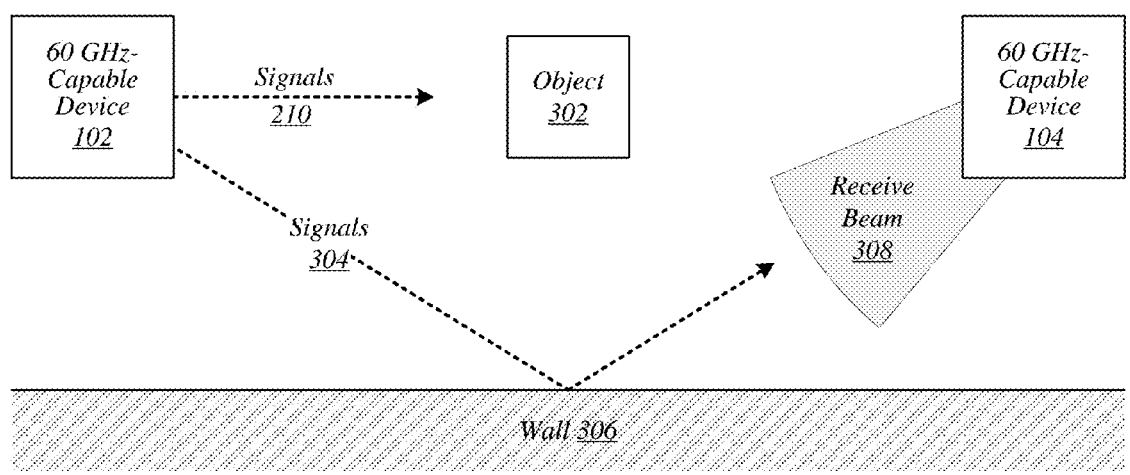
FIG. 3 illustrates an embodiment of a third operating environment.

FIG. 3 illustrates an operating environment 300 that may be representative of one in which initially-optimal transmit sector and receive sector selections may become suboptimal over time. In operating environment 300, an object 302 has moved into a position between 60 GHz-capable devices 102 and 104. Due to attenuation caused by the presence of object 302, transmissions by 60 GHz-capable device 102 in the direction in which it previously transmitted signals 210 of FIG. 2—which are depicted in operating environment 300 for purposes of illustration—may possess low levels of energy when they reach 60 GHz-capable device 104. As such, the link quality realized according to the optimal transmit and receive sectors in operating environment 200 may be significantly degraded in operating environment 300, and those transmit and receive sectors may no longer be optimal.

Due to the presence of object 302, 60 GHz-capable device 104 may be able to receive signals 304 with a higher level of received power if 60 GHz-capable device 102 transmits signals 304 in a different direction than that in which it previously transmitted signals 210. For example, if 60 GHz-capable device 102 selects a transmit sector such that it transmits signals 304 towards a wall 306, and 60 GHz-capable device 104 selects a receive sector such that its directional receive beam 308 is directed towards the incoming reflections of signals 304 off of wall 306, then 60 GHz-capable device 104 may receive signals 304 with a higher level of received power, and link quality may be improved. The embodiments are not limited to this example.

Returning to FIG. 1, in some embodiments, 60 GHz-capable devices 102 and/or 104 may be configured to reinitiate the beamforming training procedure in response to detecting a degradation in the quality of beamformed 60 GHz link 106 and/or beamformed 60 GHz link 108, in order to determine whether link quality may be improved by using different beamforming parameters. In various embodiments, 60 GHz-capable devices 102 and 104 may be configured to determine whether to reinitiate the beamforming training procedure by measuring signal-to-noise ratios (SNRs) with which they receive the wireless signals used for communications over beamformed 60 GHz links 106 and 108. In some embodiments, after measuring such an SNR, 60 GHz-capable device 102 or 60 GHz-capable device 104 may reinitiate the beamforming training procedure in response to a determination that the measured SNR is below a corresponding threshold. The embodiments are not limited in this context.

In various embodiments, transmit sectors and receive sectors selected during a given beamforming training procedure may subsequently become suboptimal not because they yield a degraded level of link quality, but because a higher level of link quality becomes available via the use of different sectors. For example, if object 302 is removed from the direct path between 60 GHz-capable devices 102 and 104 at some time following transmission of signals 304, then the transmit and receive sectors that were optimal with respect to signals 304 may no longer be optimal, because superior link quality may be available via the direct path between 60 GHz-capable devices 102 and 104. The removal of object 302 may have no effect on the link quality provided by those previously selected sectors, however, and thus they may continue to yield a link quality that exceeds the relevant threshold. In such a case, if 60 GHz-capable devices 102 and 104 are configured to reinitiate the beamforming training procedure only upon detecting link quality degradation, they may never discover the higher link quality made available by the removal of object 302. As such, in some embodiments, 60 GHz-capable devices 102 and 104 may be configured to periodically repeat the beamforming training procedure without regard for whether the measured qualities of the beamformed 60 GHz links between them have degraded since the previous beamforming training procedure was performed.

By periodically repeating the beamforming training procedure, 60 GHz-capable devices 102 and 104 may be able to discover and make use of link quality improvement opportunities of which they otherwise would have been unaware. However, under some circumstances, it may be possible for a given periodic repetition of the beamforming training procedure to result in the selection of beamforming parameters that actually degrade link quality. For example, changes in the direction of reflection off of an unstable reflector—such as the human body—during or soon after periodic beamforming training may result in sector selections that are inferior to those that were in effect prior to the periodic beamforming training. Link quality degradation in conjunction with periodic beamforming training may also result from various imperfections of the beamforming training protocol and its underlying assumptions with respect to antenna behavior. In order to maximize the benefit that periodic beamforming training provides, it may be desirable that 60 GHz-capable devices 102 and 104 be configured with the ability to revert to previous beamforming settings upon determining that beamforming settings identified by a periodic beamforming training will degrade link quality. However, according to conventional techniques, the protocol according to which 60 GHz-capable devices 102 and 104 engage in beamforming training may not provide any mechanism via which they may revert to previous beamforming settings.

Disclosed herein are exploratory beamforming training techniques for 60 GHz devices. According to various such techniques, an enhanced beamforming protocol may be implemented that defines an exploratory beamforming training procedure supporting reversion to previous beamforming settings. In some embodiments, in addition to enabling an initiator and a responder to revert to previous beamforming settings for both the initiator-responder link and the responder-initiator link, the exploratory beamforming training procedure may permit the initiator and the responder to revert to previous beamforming settings for one such link while maintaining newly-determined settings for the other such link. In various embodiments, the ability to revert to previous beamforming settings following exploratory beamforming may enable 60 GHz devices to achieve higher average levels of link quality than they may achieve in conjunction with conventional periodic beamforming training. The embodiments are not limited in this context.

Figure 4:
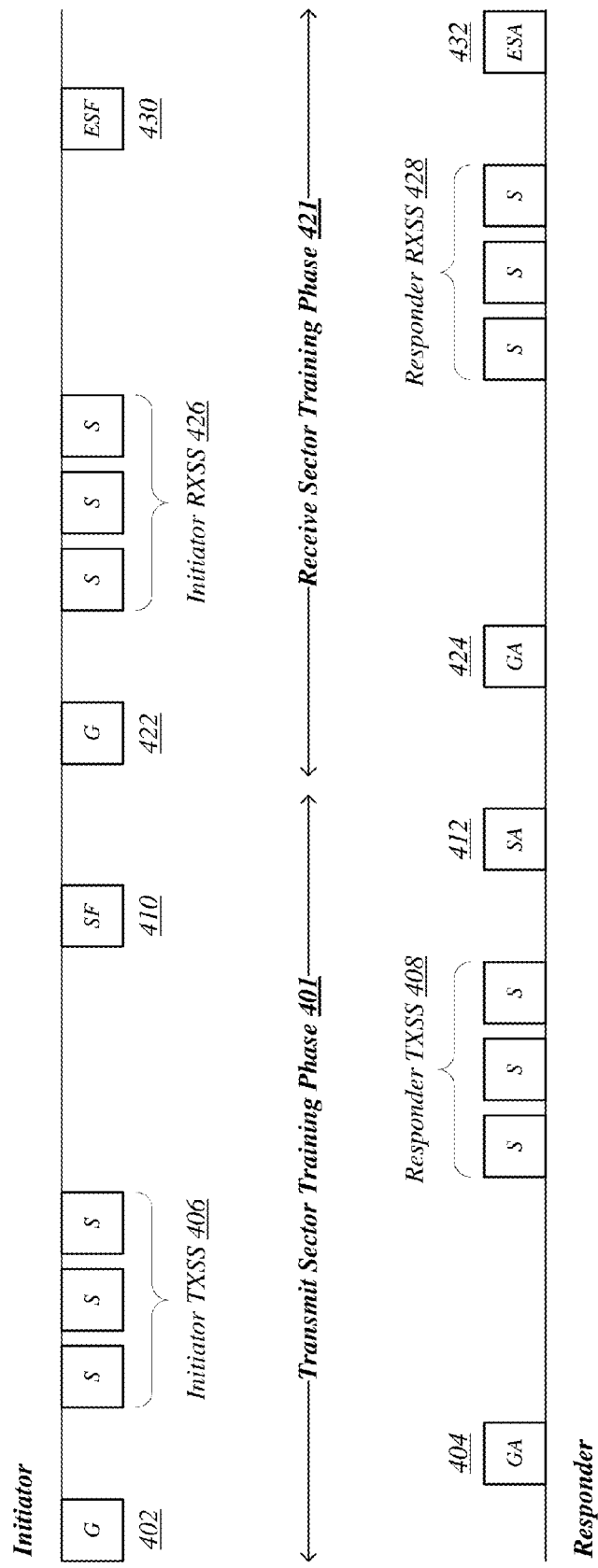
FIG. 4 illustrates an embodiment of a first communications flow.

FIG. 4 illustrates a communications flow 400 that may be representative of an exploratory beamforming training procedure that may be implemented in some embodiments to support reversion to previous beamforming settings. In communications flow 400, an initiator and a responder exchange communications in order to train an initiator-responder link and a responder-initiator link. In various embodiments, communications flow 400 may be representative of an exploratory beamforming training procedure according to which 60 GHz-capable devices 102 and 104 train beamformed 60 GHz links 106 and 108 of FIG. 1. In some embodiments, 60 GHz-capable device 102 may act as the initiator, and 60 GHz-capable device 104 may act as the responder. In various other embodiments, 60 GHz-capable device 104 may act as the initiator, and 60 GHz-capable device 102 may act as the responder. As shown in FIG. 4, in some embodiments, communications flow 400 may comprise a transmit sector training phase 401 and a receive sector training phase 421. In various embodiments, during transmit sector training phase 401, the initiator and the responder may exchange communications in order to identify respective transmit sectors towards which to direct transmissions to each other. In some embodiments, during receive sector training phase 421, the initiator and responder may exchange communications in order to identify respective receive sectors to monitor for incoming transmissions from one another. The embodiments are not limited in this context.

As shown in FIG. 4, in various embodiments, transmit sector training phase 401 may begin with the initiator sending a grant (G) frame 402, to which the responder may reply by sending a grant acknowledgment (GA) frame 404. In some embodiments, grant frame 402 may comprise an enhanced format that enables it to be used to specify that the beamforming training procedure to be performed is an exploratory beamforming training procedure. In various embodiments, for example, a bit in a beamforming control field within grant frame 402 may be designated for use to indicate exploratory beamforming. In some such embodiments, the initiator may set that designated bit to a value that indicates that the beamforming training procedure to be performed is an exploratory beamforming training procedure. Likewise, in various embodiments, grant acknowledgment frame 404 may comprise an enhanced format that enables it to be used to acknowledge a received exploratory beamforming indication. In some such embodiments, the responder may set a designated bit in a beamforming control field within grant acknowledgment frame 404 to a value that indicates that the beamforming training procedure to be performed is an exploratory beamforming training procedure. In various other embodiments, grant frame 402 and grant acknowledgment frame 404 may not comprise enhanced formats, and may not be used to indicate whether the beamforming training procedure to be performed is exploratory. The embodiments are not limited in this context.

In some embodiments, following receipt of grant acknowledgment frame 404, the initiator may send a series of sector sweep (S) frames during an initiator transmit sector sweep (TXSS) 406. In various other embodiments, the initiator and the responder may not exchange grant frame 402 and grant acknowledgment frame 404, and transmit sector training phase 401 may begin with the initiator TXSS 406. In some embodiments, during the initiator TXSS 406, the initiator may transmit a plurality of sector sweep frames, each towards a respective one of a plurality of initiator transmit (TX) sectors. In various embodiments, each such sector sweep frame may contain a sector identifier (ID) for the initiator TX sector from which it is transmitted. In some embodiments, the responder may listen for the transmitted sector sweep frames using an omnidirectional or quasi-omnidirectional receive antenna configuration, and may measure a respective signal-to-noise ratio (SNR) with which it receives each sector sweep frame that it successfully receives. In various embodiments, the responder may identify a sector sweep frame received with a highest SNR, and identify an initiator TX sector associated with the sector ID comprised in that sector sweep frame as a best initiator TX sector.

In some embodiments, following initiator TXSS 406, the responder may send a series of sector sweep frames during a responder TXSS 408. In various embodiments, during the responder TXSS 408, the responder may transmit a plurality of sector sweep frames, each towards a respective one of a plurality of responder TX sectors. In some embodiments, each such sector sweep frame may contain a sector ID for the responder TX sector from which it is transmitted. In various embodiments, each such sector sweep frame may also contain the sector ID for the best initiator TX sector, as well as the SNR with which the sector sweep frame comprising that sector ID was received at the responder. In some embodiments, the initiator may listen for the transmitted sector sweep frames using an omnidirectional or quasi-omnidirectional receive antenna configuration, and may measure a respective SNR with which it receives each sector sweep frame that it successfully receives. In various embodiments, the initiator may identify its best TX sector, and its corresponding SNR, by retrieving those parameters from any such successfully received sector sweep frame. In some embodiments, the initiator may identify a sector sweep frame received with a highest SNR, and identify a responder TX sector associated with the sector ID comprised in that sector sweep frame as a best responder TX sector.

In various embodiments, following responder TXSS 408, the initiator may send a sector sweep feedback (SF) frame 410. In some embodiments, the sector sweep feedback frame 410 may contain the sector ID for the best responder TX sector, as well as the SNR with which the sector sweep frame comprising that sector ID was received at the initiator. In various embodiments, the responder may identify its best TX sector, and its corresponding SNR, by retrieving those parameters from sector sweep feedback frame 410. In some embodiments, transmit sector training phase 401 may conclude with the responder sending a sector sweep acknowledgment (SA) frame 412 to acknowledge receipt of sector sweep feedback frame 410.

In various embodiments, receive sector training phase 421 may begin with the initiator sending a grant frame 422, to which the responder may reply by sending a grant acknowledgment frame 424. In some embodiments, grant frame 422 and grant acknowledgment frame 424 may be the same as—or similar to—grant frame 402 and grant acknowledgment frame 404, respectively. In various embodiments, following receipt of grant acknowledgment frame 424, the initiator may send a series of sector sweep frames during an initiator receive sector sweep (RXSS) 426. In some other embodiments, the initiator and the responder may not exchange grant frame 422 and grant acknowledgment frame 424, and receive sector training phase 421 may begin with the initiator RXSS 426. In various embodiments, during the initiator RXSS 426, the initiator may transmit a plurality of sector sweep frames, each towards the best initiator TX sector identified during transmit sector training phase 401. In some embodiments, the responder may monitor a different respective receive (RX) sector during the transmission of each such sector sweep frame, and may measure a respective SNR with which it receives each sector sweep frame that it successfully receives. In various embodiments, the responder may identify a sector sweep frame received with a highest SNR, and identify a responder RX sector being monitored at the time of receipt of that sector sweep frame as a best responder RX sector.

In some embodiments, following initiator RXSS 426, the responder may send a series of sector sweep frames during a responder RXSS 428. In various embodiments, during the responder RXSS 428, the responder may transmit a plurality of sector sweep frames, each towards the best responder TX sector identified during transmit sector training phase 401. In some embodiments, each such sector sweep frame may indicate the SNR corresponding to the best responder RX sector as determined during initiator RXSS 426. In various embodiments, the initiator may monitor a different respective RX sector during the transmission of each such sector sweep frame, and may measure a respective SNR with which it receives each sector sweep frame that it successfully receives. In some embodiments, the initiator may identify a sector sweep frame received with a highest SNR, and identify an initiator RX sector being monitored at the time of receipt of that sector sweep frame as a best initiator RX sector.

In various embodiments, following responder RXSS 428, the initiator may send an enhanced sector sweep feedback (ESF) frame 430. In some embodiments, the enhanced sector sweep feedback frame 430 may indicate the SNR corresponding to the best initiator RX sector as determined during responder RXSS 428. In various embodiments, enhanced sector sweep feedback frame 430 may comprise a sector sweep feedback frame constructed according to an enhanced protocol that enables the initiator to instruct the responder to revert to previous beamforming settings for one or both of the initiator-responder link and the responder-initiator link. For example, in reference to FIG. 1, enhanced sector sweep feedback frame 430 may comprise a sector sweep feedback frame constructed according to an enhanced protocol that enables 60 GHz-capable devices 102 and 104 to coordinate in order to revert to previous beamforming settings for one or both of beamformed 60 GHz links 106 and 108. In some embodiments, the responder may reply to enhanced sector sweep feedback frame 430 by sending an enhanced sector sweep acknowledgment (ESA) frame 432. In various embodiments, enhanced sector sweep acknowledgment frame 432 may comprise a sector sweep acknowledgment frame constructed according to an enhanced protocol that enables the responder to acknowledge reversion instructions received via enhanced sector sweep feedback frame 430. In some embodiments, the initiator may use enhanced sector sweep feedback frame 430 to instruct the responder to revert to previous beamforming settings for one or both of the initiator-responder link and the responder-initiator link, and the responder may use enhanced sector sweep acknowledgment frame 432 to acknowledge those reversion instructions. The embodiments are not limited in this context.

Figure 5:
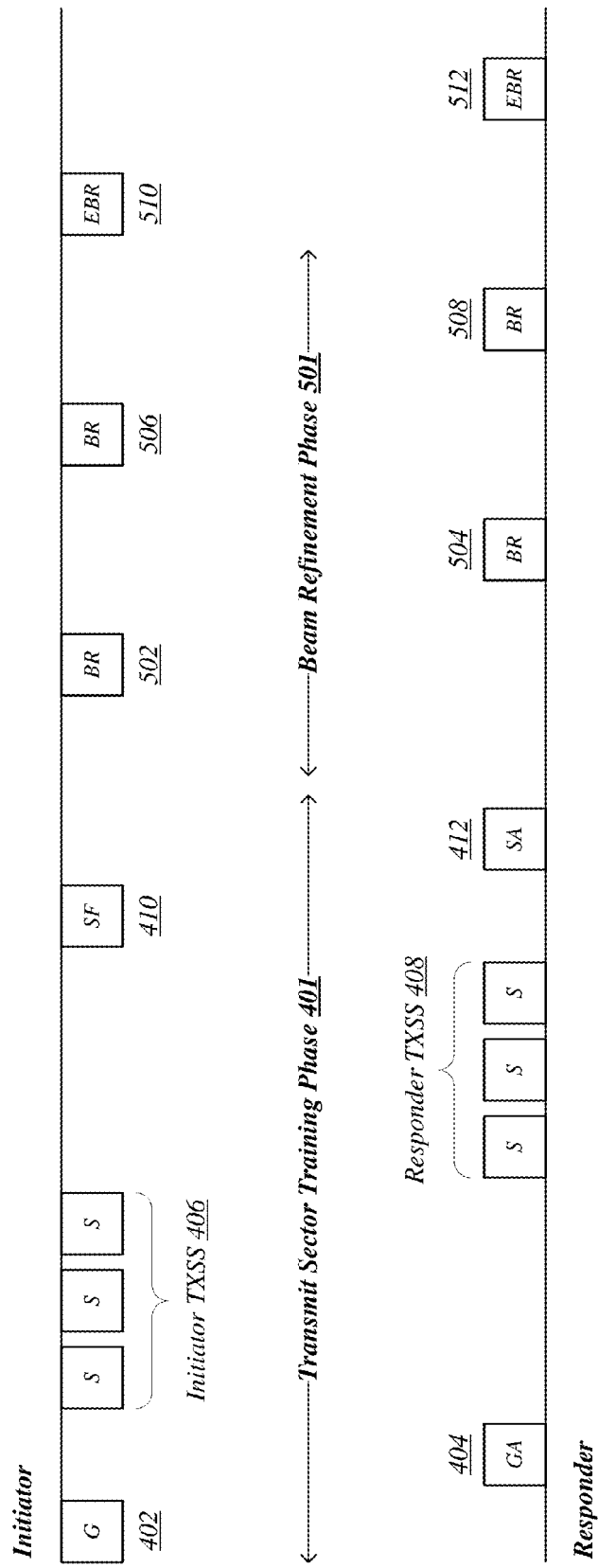
FIG. 5 illustrates an embodiment of a second communications flow.

FIG. 5 illustrates a communications flow 500 that may be representative of another exploratory beamforming training procedure that may be implemented in various embodiments to support reversion to previous beamforming settings. In communications flow 500, receive sector training phase 421 of FIG. 4 is replaced with a beam refinement phase 501. Beam refinement phase 501 may generally comprise an iterative process, during which the initiator and the responder may exchange a series of beam refinement frames in order to identify best initiator and responder RX sectors. In the example of FIG. 5, the initiator and responder exchange beam refinement (BR) frames 502, 504, 506, and 508 during beam refinement phase 501. The embodiments are not limited to this example.

In some embodiments, following completion of beam refinement phase 501, the initiator may compare an SNR measurement corresponding to the newly determined responder-initiator link beamforming settings to a previous SNR measurement corresponding to the previous responder-initiator link beamforming settings. In various embodiments, if the comparison indicates that the training of the responder-initiator link has reduced its quality, the initiator may use an enhanced beam refinement frame 510 to instruct the responder to revert to its previous beamforming settings for the responder-initiator link. In some embodiments, enhanced beam refinement frame 510 may comprise a beam refinement frame constructed according to an enhanced protocol that enables the initiator to instruct the responder to revert to previous beamforming settings for the responder-initiator link. In various embodiments, the responder may reply to enhanced beam refinement frame 510 by sending an enhanced beam refinement frame 512. In some embodiments, enhanced beam refinement frame 512 may comprise a beam refinement frame constructed according to an enhanced protocol that enables the responder to acknowledge received beamforming setting reversion instructions. In various embodiments, the responder may use enhanced beam refinement frame 512 to acknowledge the reversion instructions received via enhanced beam refinement frame 510.

In some embodiments, the enhanced protocol may also enable the responder to use enhanced beam refinement frame 512 to instruct the initiator to revert to previous beamforming settings for the initiator-responder link. In various embodiments, prior to sending enhanced beam refinement frame 512, the responder may compare an SNR measurement corresponding to the newly determined initiator-responder link beamforming settings to a previous SNR measurement corresponding to the previous initiator-responder link beamforming settings. In some embodiments, if the comparison indicates that the training of the initiator-responder link has reduced its quality, the responder may use enhanced beam refinement frame 512 to instruct the initiator to revert to its previous beamforming settings for the initiator-responder link as well as to acknowledge the reversion instructions received via enhanced beam refinement frame 510. It is worthy of note that in various embodiments, the responder's ability to use an enhanced beam refinement frame to instruct the initiator to revert to its previous beamforming settings for the initiator-responder link may not depend on the responder having received reversion instructions for the responder-initiator link. For example, in some embodiments, beam refinement frame 508 may comprise an enhanced beam refinement frame, and the responder may use it to instruct the initiator to revert to its previous beamforming settings for the initiator-responder link. The initiator may then acknowledge those instructions using enhanced beam refinement frame 510. The embodiments are not limited to this example.

Figure 6:
FIG. 6 illustrates an embodiment of a third communications flow.

In various embodiments, the determination of whether to adopt the a new beamforming configuration identified during an exploratory beamforming training procedure or to revert to a previous configuration may be made during an initial modulation and coding scheme (MCS) setup exchange that follows the exploratory beamforming training procedure. FIG. 6 illustrates a communications flow 600 that may be representative of such an initial MCS setup exchange in some embodiments. In communications flow 600, the initiator may begin the initial MCS setup exchange by sending a link measurement request (LMRQ) and a reverse direction grant (RDGrant) at 602. At 604, the responder may reply with an acknowledgment (ACK). At 606, the responder may send one or more QoS-Null packets. In various embodiments, the one or more QoS-Null packets may include indications of no-ACK policy attributes for the QoS-Null packets. At 608, the responder may send a link measurement report (LMRsp) comprising an SNR associated with the application of a new beamforming configuration for the initiator-responder link, that beamforming configuration having been determined during a preceding exploratory beamforming training procedure.

In some embodiments, the initiator may determine whether to revert to a previous beamforming configuration for the initiator-responder link by comparing the SNR comprised in the LMRsp received at 608 with a SNR measurement corresponding to the previous beamforming configuration for the initiator-responder link. In various embodiments, the initiator may also determine whether to revert to a previous beamforming configuration for the responder-initiator link by comparing a measured SNR corresponding to a new beamforming configuration for the responder-initiator link with a measured SNR corresponding to a previous beamforming configuration for the responder-initiator link. In some embodiments, in response to a determination to revert to the previous beamforming configuration for one or both of the initiator-responder link and the responder-initiator link, the initiator may use an enhanced link measurement response (ELMRsp) frame at 610 to instruct the responder to revert to its previous beamforming settings for the initiator-responder link and/or the responder-initiator link.

In various embodiments, the ELMRsp frame may comprise a link measurement response frame constructed according to an enhanced protocol that enables the initiator to instruct the responder to revert to previous beamforming settings for one or both of the initiator-responder link and the responder-initiator link. In some embodiments, according to the enhanced protocol, a value of an activity field comprised in the ELMRsp frame may be set to a value that indicates rollback of the beamforming configurations for one or both of the initiator-responder link and the responder-initiator link. In various embodiments, the activity field may be comprised in a DMG Link Margin element within the ELMRsp frame. In some embodiments, in order to acknowledge the reversion instructions comprised in the ELMRsp, the responder may reply to the ELMRsp frame with a link measurement report that includes an activity field containing the same value as that contained in the activity field in the ELMRsp frame. In various embodiments, that activity field may be contained in a DMG link acknowledgement element comprised within the link measurement report. The embodiments are not limited in this context.

Figure 7:
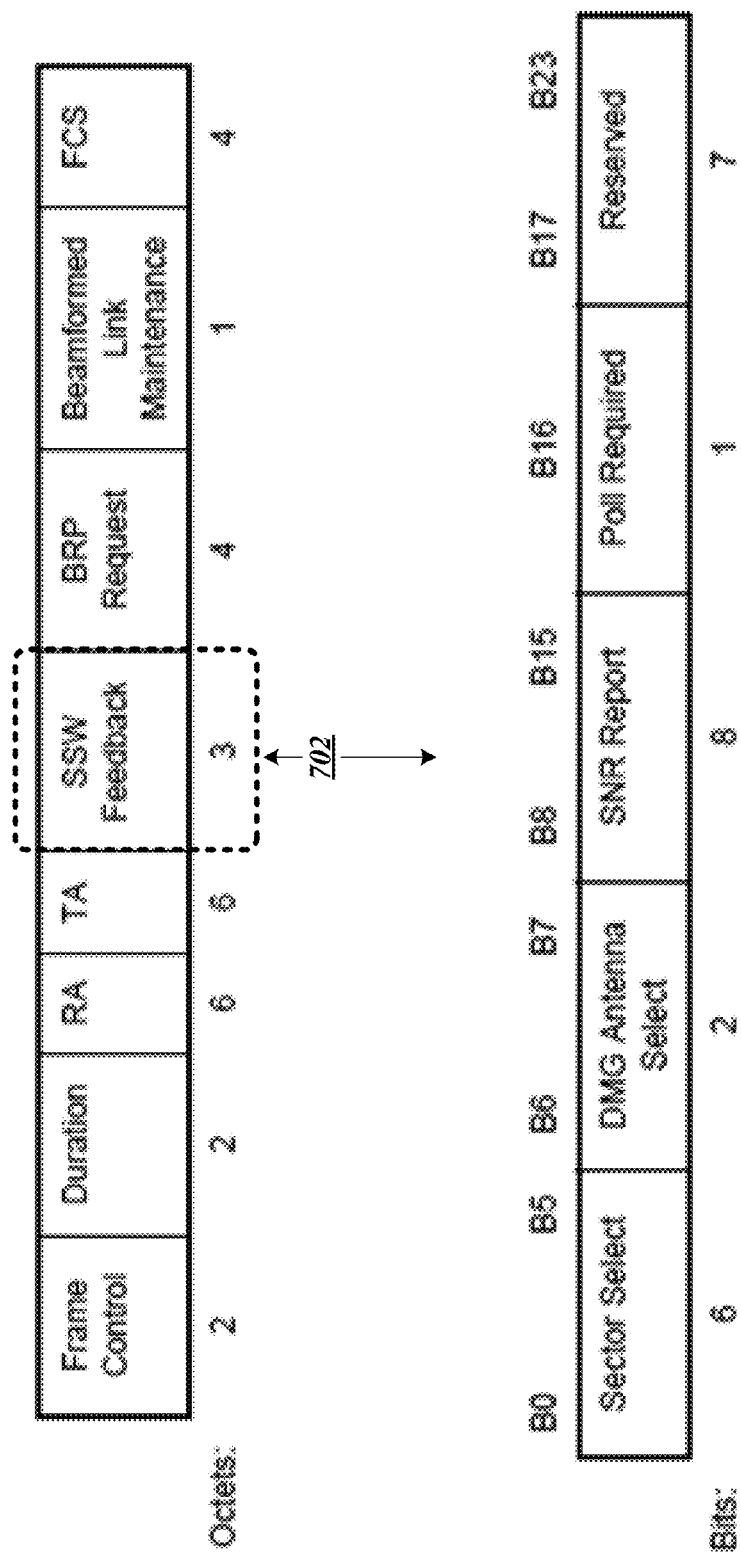
FIG. 7 illustrates an embodiment of a frame.

FIG. 7 illustrates an example of a frame 700. Frame 700 may be representative of some embodiments of a sector sweep feedback frame constructed according to an enhanced protocol that enables an initiator to instruct a responder to revert to previous beamforming settings for one or both of the initiator-responder link and the responder-initiator link. For example, frame 700 may be representative of enhanced sector sweep feedback frame 430 of FIG. 4 according to various embodiments. As shown in FIG. 7, frame 700 comprises a variety of fields, including an SSW Feedback field 702. SSW Feedback field 702 comprises a length of 3 octets, or 24 bits. SSW Feedback field 702 contains a Sector Select field of 6 bits, a DMG Antenna Select field of 2 bits, an SNR report field of 8 bits, and a Poll Required field of 1 bit. These various fields collectively occupy bits B0-B16 within SSW Feedback field 702, while bits B17-B23 are reserved.

In some embodiments, an enhanced protocol may be defined that uses reserved bits within SSW Feedback field 702 to convey beamforming configuration rollback instructions in support of exploratory beamforming training. In various embodiments, one reserved bit may be defined as a rollback bit for the initiator-responder link, and another reserved bit may be defined as a rollback bit for the responder-initiator link. For example, in some embodiments, bit B22 may be defined as the initiator-responder rollback bit, and bit B23 may be defined as the responder-initiator rollback bit. In various embodiments, such a defined rollback bit may be set to a value of 1 in order to indicate that rollback is to be performed for its corresponding link, and may be set to a value of 0 in order to indicate that new beamforming parameters for its corresponding link are to be maintained. In some embodiments, according to the enhanced protocol, the rollback bit definitions for the SSW Feedback field 702 may also apply to SSW Feedback fields in sector sweep acknowledgement frames, such as enhanced sector sweep acknowledgment frame 432 of FIG. 4. In various embodiments, for example, the responder in FIG. 4 may set bits B22 and B23 of an SSW Feedback field of enhanced sector sweep acknowledgment frame 432 to match the value of bits B22 and B23 in an SSW Feedback field of enhanced sector sweep feedback frame 430. The embodiments are not limited to this example.

Figure 8:
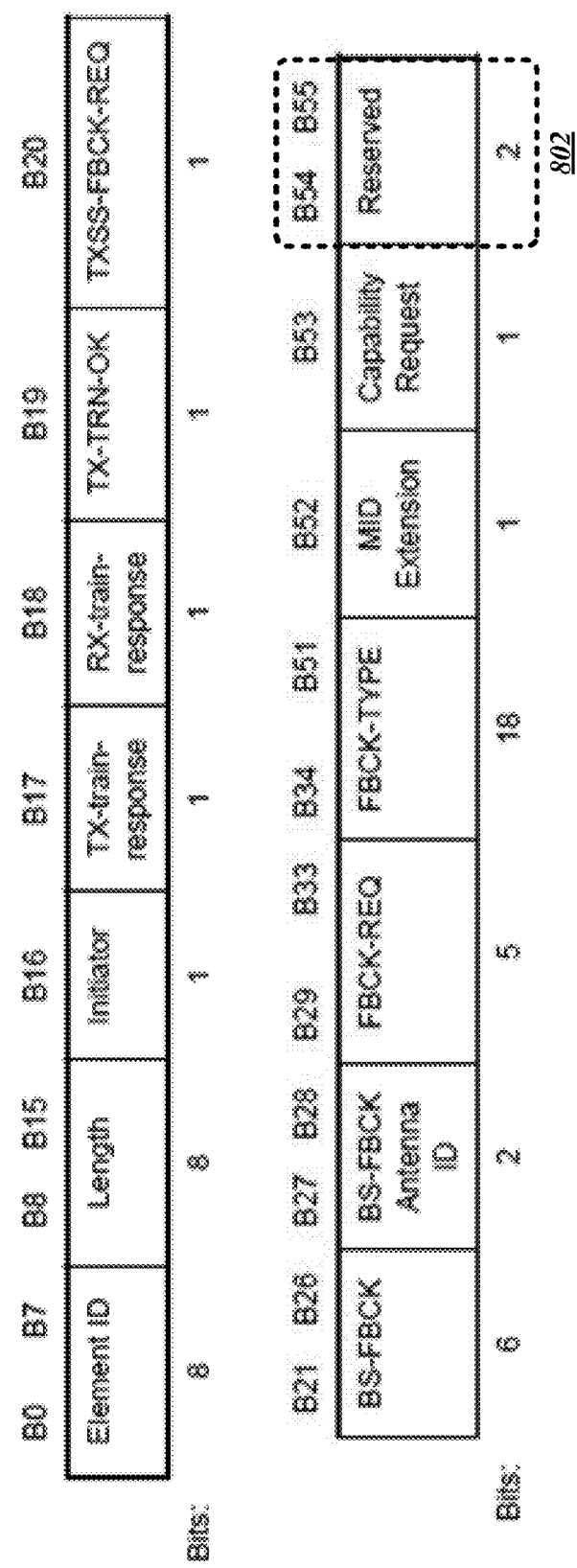
FIG. 8 illustrates an embodiment of a frame element.

FIG. 8 illustrates an example of a frame element 800. Frame element 800 may be representative of an element of a beam refinement frame that may be constructed in some embodiments according to an enhanced protocol that enables initiators and responders to send and acknowledge beamforming rollback instructions. For example, frame element 800 may be representative of an element of enhanced beam refinement frame 510 and/or enhanced beam refinement frame 512 of FIG. 5. In various embodiments, frame element 800 may comprise a DMG Beam Refinement element of a beam refinement protocol (BRP) frame. As shown in FIG. 8, frame element 800 comprises a total of 56 bits, which include two reserved bits 802. In some embodiments, an enhanced protocol may be defined that uses these reserved bits 802 to convey beamforming configuration rollback instructions in support of exploratory beamforming training. In various embodiments, bit B55 may be defined as the initiator-responder rollback bit, and bit B54 may be defined as the responder-initiator rollback bit. In some embodiments, such a defined rollback bit may be set to a value of 1 in order to indicate that rollback is to be performed for its corresponding link, and may be set to a value of 0 in order to indicate that new beamforming parameters for its corresponding link are to be maintained. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 9:
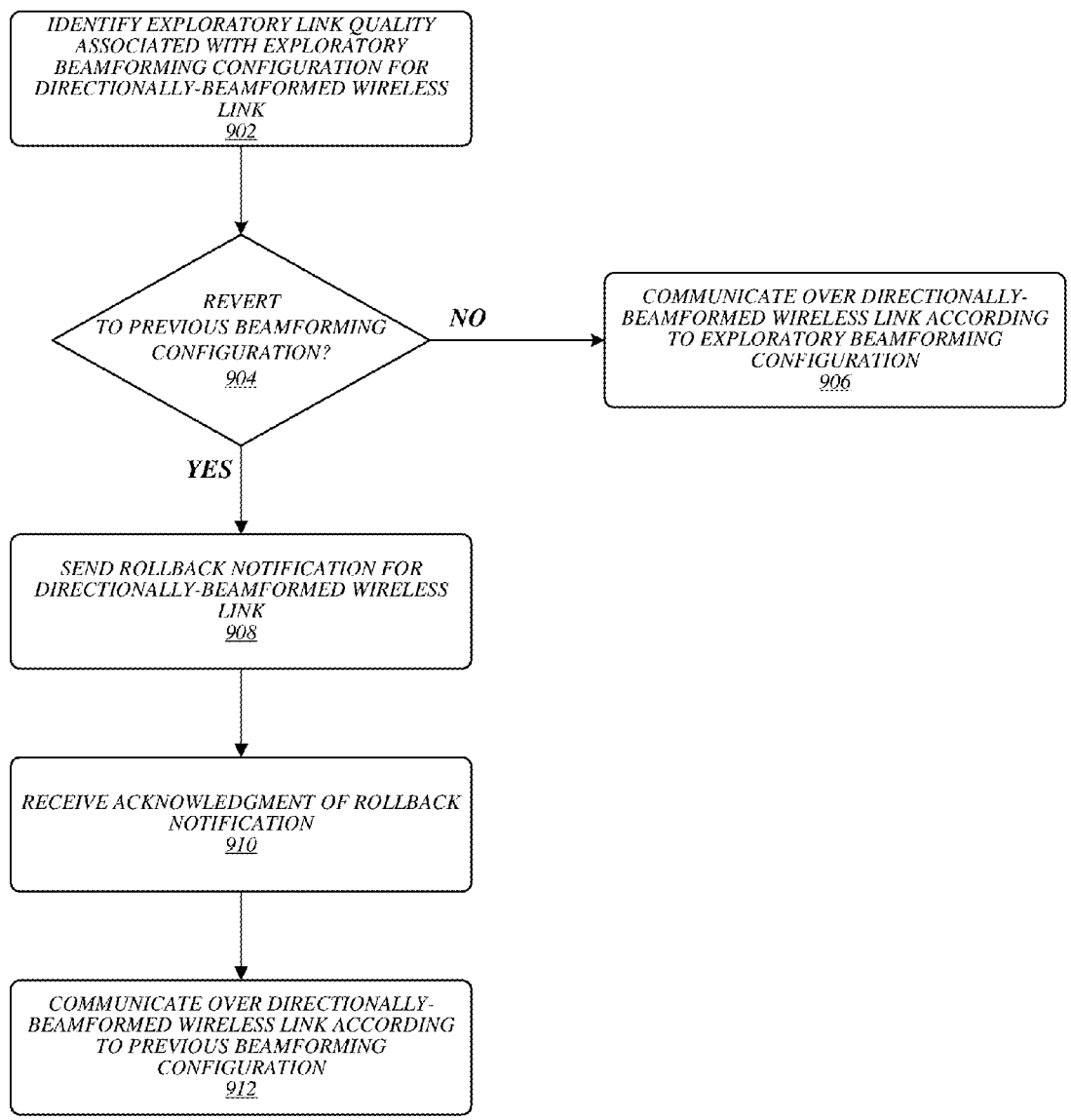
FIG. 9 illustrates an embodiment of a first logic flow.

FIG. 9 illustrates an example of a logic flow 900 that may be representative of operations that may be performed in conjunction with the implementation of exploratory beamforming training techniques in various embodiments. For example, logic flow 900 may be representative of operations that may be performed in some embodiments by 60 GHz-capable device 102. As shown in logic flow 900, an exploratory link quality may be identified at 902 that is associated with an exploratory beamforming configuration for a directionally-beamformed wireless link. For example, 60 GHz-capable device 102 may identify an SNR associated with an exploratory beamforming configuration for beamformed 60 GHz link 108. At 904, it may be determined whether to revert to a previous beamforming configuration for the directionally-beamformed wireless link. For example, 60 GHz-capable device 102 may determine whether to revert to a previous beamforming configuration for beamformed 60 GHz link 108 by comparing the SNR associated with the exploratory beamforming configuration for beamformed 60 GHz link 108 with an SNR associated with a previous beamforming configuration for beamformed 60 GHz wireless link 108. If a determination not to revert to the previous beamforming configuration is made at 904, flow may pass to 906, where communication may be performed over the directionally-beamformed wireless link according to the exploratory beamforming configuration. If a determination is made at 904 to revert to the previous beamforming configuration, flow may pass to 908.

At 908, a rollback notification may be sent for the directionally-beamformed wireless link. For example, 60 GHz-capable device 102 may send a sector sweep feedback frame comprising a sector sweep feedback field in which bit B23 is set to indicate rollback of the exploratory beamforming configuration for beamformed 60 GHz link 108. At 910, an acknowledgment of the rollback notification for the directionally-beamformed wireless link may be received. For example, 60 GHz-capable device 102 may receive a sector sweep acknowledgment frame comprising a sector sweep feedback field in which bit B23 is set to indicate rollback of the exploratory beamforming configuration for beamformed 60 GHz link 108. At 912, communication may be performed over the directionally-beamformed wireless link according to the previous beamforming configuration. For example, 60 GHz-capable device 102 may receive communications over beamformed 60 GHz link 108 using a same receive sector as that used prior to an exploratory beamforming procedure that generated the exploratory beamforming configuration for beamformed 60 GHz link 108. The embodiments are not limited to these examples.

Figure 10:
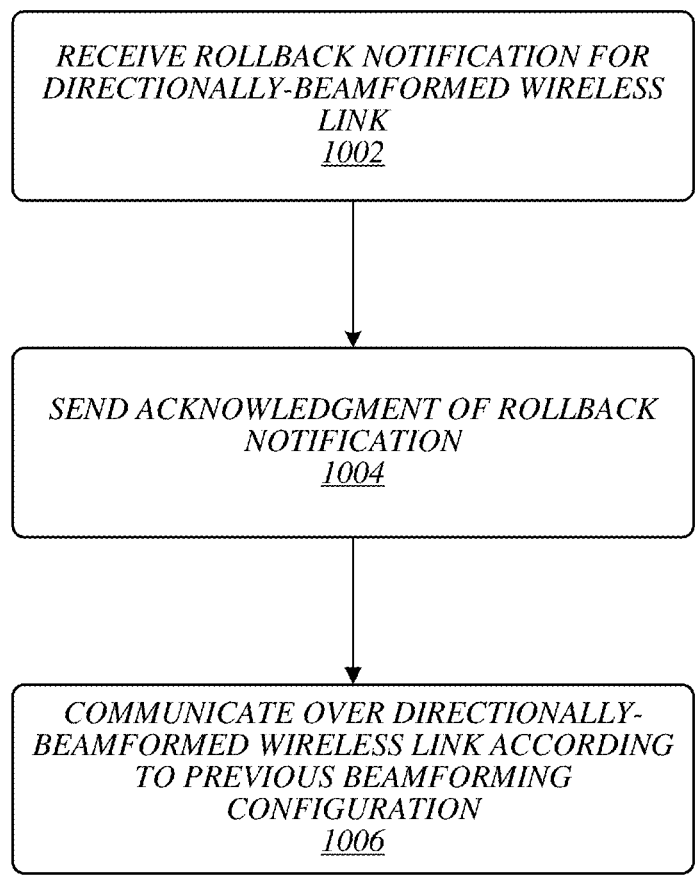
FIG. 10 illustrates an embodiment of a second logic flow.

FIG. 10 illustrates an example of a logic flow 1000 that may be representative of operations that may be performed in conjunction with the implementation of exploratory beamforming training techniques in various embodiments. For example, logic flow 1000 may be representative of operations that may be performed in some embodiments by 60 GHz-capable device 104. As shown in logic flow 1000, a rollback notification for a directionally-beamformed wireless link may be received at 1002. For example, 60 GHz-capable device 104 may receive a sector sweep feedback frame comprising a sector sweep feedback field in which bit B23 is set to indicate rollback of the exploratory beamforming configuration for beamformed 60 GHz link 108.

At 1004, an acknowledgment of the rollback notification for the directionally beamformed wireless link may be sent. For example, 60 GHz-capable device 104 may send a sector sweep acknowledgment frame comprising a sector sweep feedback field in which bit B23 is set to indicate rollback of the exploratory beamforming configuration for beamformed 60 GHz link 108. At 1006, communication may be performed over the directionally-beamformed wireless link according to the previous beamforming configuration. For example, 60 GHz-capable device 104 may transmit data over beamformed 60 GHz link 108 using a same transmit sector as that used prior to an exploratory beamforming procedure that generated the exploratory beamforming configuration for beamformed 60 GHz link 108. The embodiments are not limited to these examples.

FIG. 11 illustrates an embodiment of a storage medium 1100. Storage medium 1100 may comprise any non-transitory computer-readable storage medium or machine-readable storage medium, such as an optical, magnetic or semiconductor storage medium. In various embodiments, storage medium 1100 may comprise an article of manufacture. In some embodiments, storage medium 1100 may store computer-executable instructions, such as computer-executable instructions to implement one or both of logic flow 900 of FIG. 9 and logic flow 1000 of FIG. 10. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 12:
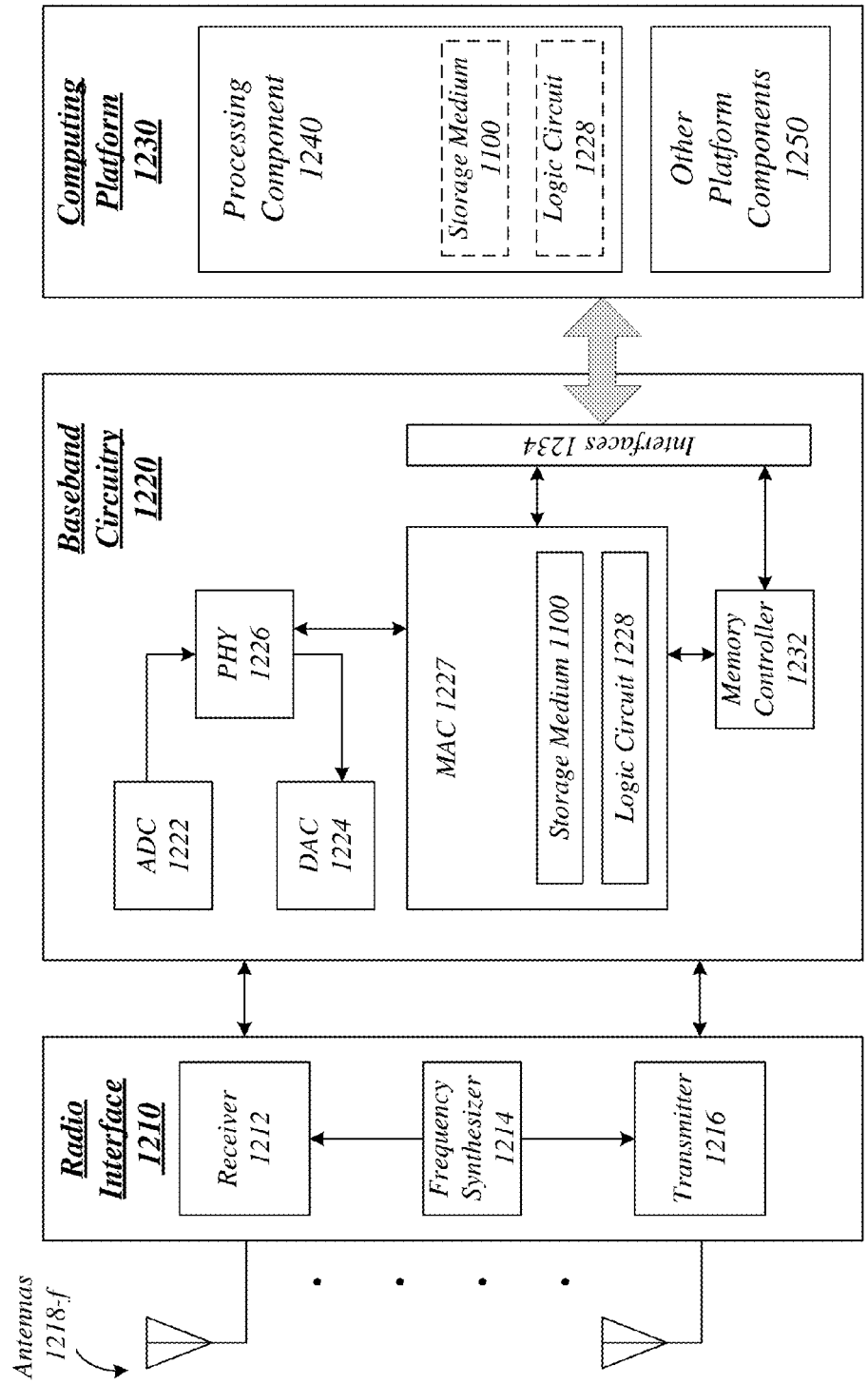
FIG. 12 illustrates an embodiment of a device.

FIG. 12 illustrates an embodiment of a communications device 1200 that may implement one or more of 60 GHz-capable device 102, 60 GHz-capable device 104, logic flow 900, logic flow 1000, and storage medium 1100 of FIG. 11. In various embodiments, device 1200 may comprise a logic circuit 1228. The logic circuit 1228 may include physical circuits to perform operations described for one or more of 60 GHz-capable device 102, 60 GHz-capable device 104, logic flow 900, and logic flow 1000, for example. As shown in FIG. 12, device 1200 may include a radio interface 1210, baseband circuitry 1220, and computing platform 1230, although the embodiments are not limited to this configuration.

The device 1200 may implement some or all of the structure and/or operations for one or more of 60 GHz-capable device 102, 60 GHz-capable device 104, logic flow 900, logic flow 1000, storage medium 1100 of FIG. 11, and logic circuit 1228 in a single computing entity, such as entirely within a single device. Alternatively, the device 1200 may distribute portions of the structure and/or operations for one or more of 60 GHz-capable device 102, 60

GHz-capable device 104, logic flow 900, logic flow 1000, storage medium 1100 of FIG. 11, and logic circuit 1228 across multiple computing entities using a distributed system architecture, such as a client-server architecture, a S-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1210 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. Radio interface 1210 may include, for example, a receiver 1212, a frequency synthesizer 1214, and/or a transmitter 1216. Radio interface 1210 may include bias controls, a crystal oscillator and/or one or more antennas 1218-f. In another embodiment, radio interface 1210 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1220 may communicate with radio interface 1210 to process receive and/or transmit signals and may include, for example, an analog-to-digital converter 1222 for down converting received signals, a digital-to-analog converter 1224 for up converting signals for transmission. Further, baseband circuitry 1220 may include a baseband or physical layer (PHY) processing circuit 1226 for PHY link layer processing of respective receive/transmit signals. Baseband circuitry 1220 may include, for example, a medium access control (MAC) processing circuit 1227 for MAC/data link layer processing. Baseband circuitry 1220 may include a memory controller 1232 for communicating with MAC processing circuit 1227 and/or a computing platform 1230, for example, via one or more interfaces 1234.

In some embodiments, PHY processing circuit 1226 may include a frame construction and/or detection module, in combination with additional circuitry such as a buffer memory, to construct and/or deconstruct communication frames. Alternatively or in addition, MAC processing circuit 1227 may share processing for certain of these functions or perform these processes independent of PHY processing circuit 1226. In some embodiments, MAC and PHY processing may be integrated into a single circuit.

The computing platform 1230 may provide computing functionality for the device 1200. As shown, the computing platform 1230 may include a processing component 1240. In addition to, or alternatively of, the baseband circuitry 1220, the device 1200 may execute processing operations or logic for one or more of 60 GHz-capable device 102, 60 GHz-capable device 104, logic flow 900, logic flow 1000, storage medium 1100 of FIG. 11, and logic circuit 1228 using the processing component 1240. The processing component 1240 (and/or PHY 1226 and/or MAC 1227) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1230 may further include other platform components 1250. Other platform components 1250 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1200 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 1200 described herein, may be included or omitted in various embodiments of device 1200, as suitably desired.

Embodiments of device 1200 may be implemented using single input single output (SISO) architectures. However, certain implementations may include multiple antennas (e.g., antennas 1218-f) for transmission and/or reception using adaptive antenna techniques for beamforming or spatial division multiple access (SDMA) and/or using MIMO communication techniques.

The components and features of device 1200 may be implemented using any combination of discrete circuitry, application specific integrated circuits (ASICs), logic gates and/or single chip architectures. Further, the features of device 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 13:
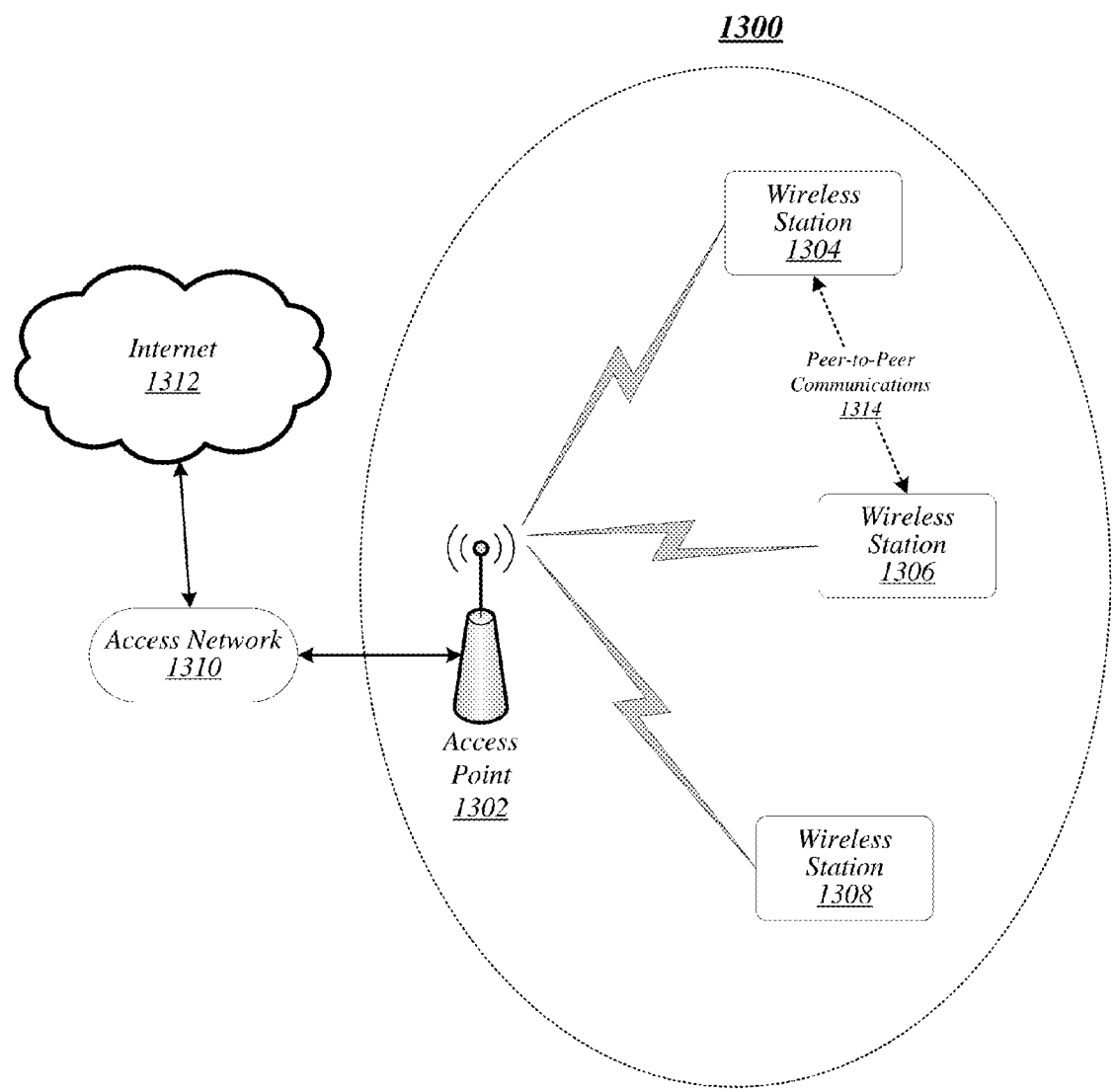
FIG. 13 illustrates an embodiment of a wireless network.

FIG. 13 illustrates an embodiment of a wireless network 1300. As shown in FIG. 13, wireless network comprises an access point 1302 and wireless stations 1304, 1306, and 1308. In various embodiments, wireless network 1300 may comprise a wireless local area network (WLAN), such as a WLAN implementing one or more Institute of Electrical and Electronics Engineers (IEEE) 802.11 standards (sometimes collectively referred to as "Wi-Fi"). In some other embodiments, wireless network 1300 may comprise another type of wireless network, and/or may implement other wireless communications standards. In various embodiments, for example, wireless network 1300 may comprise a WWAN or WPAN rather than a WLAN. The embodiments are not limited to this example.

In some embodiments, wireless network 1300 may implement one or more broadband wireless communications standards, such as 3G or 4G standards, including their revisions, progeny, and variants. Examples of 3G or 4G wireless standards may include without limitation any of the IEEE 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8-12 of LTE/System Architecture Evolution (SAE), and so forth. The embodiments are not limited in this context.

In various embodiments, wireless stations 1304, 1306, and 1308 may communicate with access point 1302 in order to obtain connectivity to one or more external data networks. In some embodiments, for example, wireless stations 1304, 1306, and 1308 may connect to the Internet 1312 via access point 1302 and access network 1310. In various embodiments, access network 1310 may comprise a private network that provides subscription-based Internet-connectivity, such as an Internet Service Provider (ISP) network. The embodiments are not limited to this example.

In various embodiments, two or more of wireless stations 1304, 1306, and 1308 may communicate with each other directly by exchanging peer-to-peer communications. For example, in the example of FIG. 13, wireless stations 1304 and 1306 communicate with each other directly by exchanging peer-to-peer communications 1314. In some embodiments, such peer-to-peer communications may be performed according to one or more Wi-Fi Alliance (WFA) standards. For example, in various embodiments, such peer-to-peer communications may be performed according to the WFA Wi-Fi Direct standard, 2010 Release. In various embodiments, such peer-to-peer communications may additionally or alternatively be performed using one or more interfaces, protocols, and/or standards developed by the WFA Wi-Fi Direct Services (WFDS) Task Group. The embodiments are not limited to these examples.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Example 1 is a wireless communication apparatus, comprising a station (STA) comprising logic, at least a portion of which is in hardware, the logic to identify an exploratory link quality associated with an exploratory beamforming configuration for a directionally-beamformed wireless link, determine whether to revert to a previous beamforming configuration for the directionally-beamformed wireless link based on the exploratory link quality, and in response to a determination to revert to the previous beamforming configuration, send a frame comprising a rollback notification for the directionally-beamformed wireless link.

Example 2 is the wireless communication apparatus of Example 1, the logic to determine whether to revert to the previous beamforming configuration for the directionally-beamformed wireless link by comparing a link quality associated with the previous beamforming configuration to the exploratory link quality associated with the exploratory beamforming configuration.

Example 3 is the wireless communication apparatus of Example 1, the logic to initiate an exploratory beamforming training procedure, the exploratory beamforming training procedure to comprise generating the exploratory beamforming configuration for the directionally-beamformed wireless link.

Example 4 is the wireless communication apparatus of Example 3, the logic to initiate the exploratory beamforming training procedure by sending a sector sweep frame.

Example 5 is the wireless communication apparatus of Example 3, the logic to initiate the exploratory beamforming training procedure by sending a grant frame.

Example 6 is the wireless communication apparatus of Example 5, the grant frame to comprise a beamforming control field containing a bit set to a value to indicate exploratory beamforming.

Example 7 is the wireless communication apparatus of Example 1, the logic to receive a second frame comprising an acknowledgment of the rollback notification for the directionally-beamformed wireless link.

Example 8 is the wireless communication apparatus of Example 7, the logic to revert to a previous beamforming configuration for a second directionally-beamformed wireless link in response to a determination that the second frame comprises a rollback notification for the second directionally-beamformed wireless link.

Example 9 is the wireless communication apparatus of Example 7, the sent frame to comprise the rollback notification for the directionally-beamformed wireless link and a rollback notification for a second directionally-beamformed wireless link, the received second frame to comprise the acknowledgment of the rollback notification for the directionally-beamformed wireless link and an acknowledgment of the rollback notification for the second directionally-beamformed wireless link.

Example 10 is the wireless communication apparatus of Example 1, the frame to comprise a sector sweep feedback frame.

Example 11 is the wireless communication apparatus of Example 10, the rollback notification to comprise a rollback bit in a field of the sector sweep feedback frame.

Example 12 is the wireless communication apparatus of Example 11, the field to comprise a Sector Sweep (SSW) Feedback field of the sector sweep feedback frame.

Example 13 is the wireless communication apparatus of Example 12, the rollback bit to comprise a B22 bit or a B23 bit of the SSW Feedback field.

Example 14 is the wireless communication apparatus of Example 1, the frame to comprise a beam refinement frame.

Example 15 is the wireless communication apparatus of Example 14, the rollback notification to comprise a rollback bit in an element of the beam refinement frame.

Example 16 is the wireless communication apparatus of Example 15, the element to comprise a Directional Multi-Gigabit (DMG) Beam Refinement element of the beam refinement frame.

Example 17 is the wireless communication apparatus of Example 16, the rollback bit to comprise a B54 bit or a B55 bit of the DMG Beam Refinement element.

Example 18 is the wireless communication apparatus of Example 1, the frame to comprise a link measurement response frame.

Example 19 is the wireless communication apparatus of Example 18, the rollback notification to comprise a beamforming rollback activity value in a field of the link measurement response frame.

Example 20 is the wireless communication apparatus of Example 19, the field to comprise an Activity field of a Directional Multi-Gigabit (DMG) Link Margin element of the link measurement response frame.

Example 21 is a system, comprising a wireless communication apparatus according to any of Examples 1 to 20 at least one radio frequency (RF) transceiver, and at least one RF antenna.

Example 22 is the system of Example 21, comprising a touchscreen display.

Example 23 is a wireless communication apparatus, comprising a station (STA) comprising logic, at least a portion of which is in hardware, the logic to revert from an exploratory beamforming configuration for a directionally-beamformed wireless link to a previous beamforming configuration for the directionally-beamformed wireless link in response to receipt of a first frame comprising a rollback notification for the directionally-beamformed wireless link, send a second frame comprising an acknowledgment of the rollback notification, and communicate over the directionally-beamformed wireless link according to the previous beamforming configuration.

Example 24 is the wireless communication apparatus of Example 23, the first frame to comprise a rollback notification for a second directionally-beamformed wireless link, the second frame to comprise an acknowledgment of the rollback notification for the second directionally-beamformed wireless link.

Example 25 is the wireless communication apparatus of Example 23, the logic to determine whether to revert to a previous beamforming configuration for a second directionally-beamformed wireless link based on an exploratory link quality associated with an exploratory beamforming configuration for the second directionally-beamformed wireless link.

Example 26 is the wireless communication apparatus of Example 25, the logic to include a rollback notification for the second directionally-beamformed wireless link in the second frame in response to a determination to revert to the previous beamforming configuration for the second directionally-beamformed wireless link.

Example 27 is the wireless communication apparatus of Example 23, the first frame to comprise a sector sweep feedback frame, the second frame to comprise a sector sweep acknowledgment frame.

Example 28 is the wireless communication apparatus of Example 23, the first and second frames to comprise beam refinement frames.

Example 29 is the wireless communication apparatus of Example 28, the logic to use a first rollback bit of the second beam refinement frame to acknowledge the rollback notification comprised in the first beam refinement frame and use a second roll back bit of the second beam refinement frame to provide a rollback notification for a second directionally-beamformed wireless link.

Example 30 is the wireless communication apparatus of Example 23, the second frame to comprise a directional multi-gigabit (DMG) link acknowledgment element comprising a beamforming rollback activity value set to acknowledge the rollback notification for the directionally-beamformed wireless link.

Example 31 is a system, comprising a wireless communication apparatus according to any of Examples 23 to 30, at least one radio frequency (RF) transceiver, and at least one RF antenna.

Example 32 is the system of Example 31, comprising a touchscreen display.

Example 33 is at least one non-transitory computer-readable storage medium comprising a set of wireless communication instructions that, in response to being executed at a station (STA), cause the STA to identify an exploratory link quality associated with an exploratory beamforming configuration for a directionally-beamformed wireless link, determine whether to revert to a previous beamforming configuration for the directionally-beamformed wireless link based on the exploratory link quality, and in response to a determination to revert to the previous beamforming configuration, send a frame comprising a rollback notification for the directionally-beamformed wireless link.

Example 34 is the at least one non-transitory computer-readable storage medium of Example 33, comprising wireless communication instructions that, in response to being executed at the STA, cause the STA to determine whether to revert to the previous beamforming configuration for the directionally-beamformed wireless link by comparing a link quality associated with the previous beamforming configuration to the exploratory link quality associated with the exploratory beamforming configuration.

Example 35 is the at least one non-transitory computer-readable storage medium of Example 33, comprising wireless communication instructions that, in response to being executed at the STA, cause the STA to initiate an exploratory beamforming training procedure, the exploratory beamforming training procedure to comprise generating the exploratory beamforming configuration for the directionally-beamformed wireless link.

Example 36 is the at least one non-transitory computer-readable storage medium of Example 35, comprising wireless communication instructions that, in response to being executed at the STA, cause the STA to initiate the exploratory beamforming training procedure by sending a sector sweep frame.

Example 37 is the at least one non-transitory computer-readable storage medium of Example 35, comprising wireless communication instructions that, in response to being executed at the STA, cause the STA to initiate the exploratory beamforming training procedure by sending a grant frame.

Example 38 is the at least one non-transitory computer-readable storage medium of Example 37, the grant frame to comprise a beamforming control field containing a bit set to a value to indicate exploratory beamforming.

Example 39 is the at least one non-transitory computer-readable storage medium of Example 33, comprising wireless communication instructions that, in response to being executed at the STA, cause the STA to receive a second frame comprising an acknowledgment of the rollback notification for the directionally-beamformed wireless link.

Example 40 is the at least one non-transitory computer-readable storage medium of Example 39, comprising wireless communication instructions that, in response to being executed at the STA, cause the STA to revert to a previous beamforming configuration for a second directionally-beamformed wireless link in response to a determination that the second frame comprises a rollback notification for the second directionally-beamformed wireless link.

Example 41 is the at least one non-transitory computer-readable storage medium of Example 39, the sent frame to comprise the rollback notification for the directionally-beamformed wireless link and a rollback notification for a second directionally-beamformed wireless link, the received second frame to comprise the acknowledgment of the rollback notification for the directionally-beamformed wireless link and an acknowledgment of the rollback notification for the second directionally-beamformed wireless link.

Example 42 is the at least one non-transitory computer-readable storage medium of Example 33, the frame to comprise a sector sweep feedback frame.

Example 43 is the at least one non-transitory computer-readable storage medium of Example 42, the rollback notification to comprise a rollback bit in a field of the sector sweep feedback frame.

Example 44 is the at least one non-transitory computer-readable storage medium of Example 43, the field to comprise a Sector Sweep (SSW) Feedback field of the sector sweep feedback frame.

Example 45 is the at least one non-transitory computer-readable storage medium of Example 44, the rollback bit to comprise a B22 bit or a B23 bit of the SSW Feedback field.

Example 46 is the at least one non-transitory computer-readable storage medium of Example 33, the frame to comprise a beam refinement frame.

Example 47 is the at least one non-transitory computer-readable storage medium of Example 46, the rollback notification to comprise a rollback bit in an element of the beam refinement frame.

Example 48 is the at least one non-transitory computer-readable storage medium of Example 47, the element to comprise a Directional Multi-Gigabit (DMG) Beam Refinement element of the beam refinement frame.

Example 49 is the at least one non-transitory computer-readable storage medium of Example 48, the rollback bit to comprise a B54 bit or a B55 bit of the DMG Beam Refinement element.

Example 50 is the at least one non-transitory computer-readable storage medium of Example 33, the frame to comprise a link measurement response frame.

Example 51 is the at least one non-transitory computer-readable storage medium of Example 50, the rollback notification to comprise a beamforming rollback activity value in a field of the link measurement response frame.

Example 52 is the at least one non-transitory computer-readable storage medium of Example 51, the field to comprise an Activity field of a Directional Multi-Gigabit (DMG) Link Margin element of the link measurement response frame.

Example 53 is at least one non-transitory computer-readable storage medium comprising a set of wireless communication instructions that, in response to being executed at a station (STA), cause the STA to revert from an exploratory beamforming configuration for a directionally-beamformed wireless link to a previous beamforming configuration for the directionally-beamformed wireless link in response to receipt of a first frame comprising a rollback notification for the directionally-beamformed wireless link, send a second frame comprising an acknowledgment of the rollback notification, and communicate over the directionally-beamformed wireless link according to the previous beamforming configuration.

Example 54 is the at least one non-transitory computer-readable storage medium of Example 53, the first frame to comprise a rollback notification for a second directionally-beamformed wireless link, the second frame to comprise an acknowledgment of the rollback notification for the second directionally-beamformed wireless link.

Example 55 is the at least one non-transitory computer-readable storage medium of Example 53, comprising wireless communication instructions that, in response to being executed at the STA, cause the STA to determine whether to revert to a previous beamforming configuration for a second directionally-beamformed wireless link based on an exploratory link quality associated with an exploratory beamforming configuration for the second directionally-beamformed wireless link.

Example 56 is the at least one non-transitory computer-readable storage medium of Example 55, comprising wireless communication instructions that, in response to being executed at the STA, cause the STA to include a rollback notification for the second directionally-beamformed wireless link in the second frame in response to a determination to revert to the previous beamforming configuration for the second directionally-beamformed wireless link.

Example 57 is the at least one non-transitory computer-readable storage medium of Example 53, the first frame to comprise a sector sweep feedback frame, the second frame to comprise a sector sweep acknowledgment frame.

Example 58 is the at least one non-transitory computer-readable storage medium of Example 53, the first and second frames to comprise beam refinement frames.

Example 59 is the at least one non-transitory computer-readable storage medium of Example 58, comprising wireless communication instructions that, in response to being executed at the STA, cause the STA to use a first rollback bit of the second beam refinement frame to acknowledge the rollback notification comprised in the first beam refinement frame, and use a second roll back bit of the second beam refinement frame to provide a rollback notification for a second directionally-beamformed wireless link.

Example 60 is the at least one non-transitory computer-readable storage medium of Example 53, the second frame to comprise a directional multi-gigabit (DMG) link acknowledgment element comprising a beamforming rollback activity value set to acknowledge the rollback notification for the directionally-beamformed wireless link.

Example 61 is a wireless communication method, comprising identifying, at a station (STA), an exploratory link quality associated with an exploratory beamforming configuration for a directionally-beamformed wireless link, determining, by processing circuitry of the STA, whether to revert to a previous beamforming configuration for the directionally-beamformed wireless link based on the exploratory link quality, and sending a frame comprising a rollback notification for the directionally-beamformed wireless link in response to a determination to revert to the previous beamforming configuration.

Example 62 is the wireless communication method of Example 61, comprising determining whether to revert to the previous beamforming configuration for the directionally-beamformed wireless link by comparing a link quality associated with the previous beamforming configuration to the exploratory link quality associated with the exploratory beamforming configuration.

Example 63 is the wireless communication method of Example 61, comprising initiating an exploratory beamforming training procedure, the exploratory beamforming training procedure to comprise generating the exploratory beamforming configuration for the directionally-beamformed wireless link.

Example 64 is the wireless communication method of Example 63, comprising initiating the exploratory beamforming training procedure by sending a sector sweep frame.

Example 65 is the wireless communication method of Example 63, comprising initiating the exploratory beamforming training procedure by sending a grant frame.

Example 66 is the wireless communication method of Example 65, the grant frame to comprise a beamforming control field containing a bit set to a value to indicate exploratory beamforming.

Example 67 is the wireless communication method of Example 61, comprising receiving a second frame comprising an acknowledgment of the rollback notification for the directionally-beamformed wireless link.

Example 68 is the wireless communication method of Example 67, comprising reverting to a previous beamforming configuration for a second directionally-beamformed wireless link in response to a determination that the second frame comprises a rollback notification for the second directionally-beamformed wireless link.

Example 69 is the wireless communication method of Example 67, the sent frame to comprise the rollback notification for the directionally-beamformed wireless link and a rollback notification for a second directionally-beamformed wireless link, the received second frame to comprise the acknowledgment of the rollback notification for the directionally-beamformed wireless link and an acknowledgment of the rollback notification for the second directionally-beamformed wireless link.

Example 70 is the wireless communication method of Example 61, the frame to comprise a sector sweep feedback frame.

Example 71 is the wireless communication method of Example 70, the rollback notification to comprise a rollback bit in a field of the sector sweep feedback frame.

Example 72 is the wireless communication method of Example 71, the field to comprise a Sector Sweep (SSW) Feedback field of the sector sweep feedback frame.

Example 73 is the wireless communication method of Example 72, the rollback bit to comprise a B22 bit or a B23 bit of the SSW Feedback field.

Example 74 is the wireless communication method of Example 61, the frame to comprise a beam refinement frame.

Example 75 is the wireless communication method of Example 74, the rollback notification to comprise a rollback bit in an element of the beam refinement frame.

Example 76 is the wireless communication method of Example 75, the element to comprise a Directional Multi-Gigabit (DMG) Beam Refinement element of the beam refinement frame.

Example 77 is the wireless communication method of Example 76, the rollback bit to comprise a B54 bit or a B55 bit of the DMG Beam Refinement element.

Example 78 is the wireless communication method of Example 61, the frame to comprise a link measurement response frame.

Example 79 is the wireless communication method of Example 78, the rollback notification to comprise a beamforming rollback activity value in a field of the link measurement response frame.

Example 80 is the wireless communication method of Example 79, the field to comprise an Activity field of a Directional Multi-Gigabit (DMG) Link Margin element of the link measurement response frame.

Example 81 is at least one non-transitory computer-readable storage medium comprising a set of instructions that, in response to being executed on a computing device, cause the computing device to perform a wireless communication method according to any of Examples 61 to 80.

Example 82 is an apparatus, comprising means for performing a wireless communication method according to any of Examples 61 to 80.

Example 83 is a system, comprising the apparatus of Example 82, at least one radio frequency (RF) transceiver, and at least one RF antenna.

Example 84 is the system of Example 83, comprising a touchscreen display.

Example 85 is a wireless communication method, comprising reverting, by processing circuitry at a station (STA), from an exploratory beamforming configuration for a directionally-beamformed wireless link to a previous beamforming configuration for the directionally-beamformed wireless link in response to receipt of a first frame comprising a rollback notification for the directionally-beamformed wireless link, sending a second frame comprising an acknowledgment of the rollback notification, and communicating over the directionally-beamformed wireless link according to the previous beamforming configuration.

Example 86 is the wireless communication method of Example 85, the first frame to comprise a rollback notification for a second directionally-beamformed wireless link, the second frame to comprise an acknowledgment of the rollback notification for the second directionally-beamformed wireless link.

Example 87 is the wireless communication method of Example 85, comprising determining whether to revert to a previous beamforming configuration for a second directionally-beamformed wireless link based on an exploratory link quality associated with an exploratory beamforming configuration for the second directionally-beamformed wireless link.

Example 88 is the wireless communication method of Example 87, comprising including a rollback notification for the second directionally-beamformed wireless link in the second frame in response to a determination to revert to the previous beamforming configuration for the second directionally-beamformed wireless link.

Example 89 is the wireless communication method of Example 85, the first frame to comprise a sector sweep feedback frame, the second frame to comprise a sector sweep acknowledgment frame.

Example 90 is the wireless communication method of Example 85, the first and second frames to comprise beam refinement frames.

Example 91 is the wireless communication method of Example 90, comprising using a first rollback bit of the second beam refinement frame to acknowledge the rollback notification comprised in the first beam refinement frame, and using a second roll back bit of the second beam refinement frame to provide a rollback notification for a second directionally-beamformed wireless link.

Example 92 is the wireless communication method of Example 85, the second frame to comprise a directional multi-gigabit (DMG) link acknowledgment element comprising a beamforming rollback activity value set to acknowledge the rollback notification for the directionally-beamformed wireless link.

Example 93 is at least one non-transitory computer-readable storage medium comprising a set of instructions that, in response to being executed on a computing device, cause the computing device to perform a wireless communication method according to any of Examples 85 to 92.

Example 94 is an apparatus, comprising means for performing a wireless communication method according to any of Examples 85 to 92.

Example 95 is a system, comprising the apparatus of Example 94, at least one radio frequency (RF) transceiver, and at least one RF antenna.

Example 96 is the system of Example 95, comprising a touchscreen display.

Example 97 is a wireless communication apparatus, comprising means for identifying, at a station (STA), an exploratory link quality associated with an exploratory beamforming configuration for a directionally-beamformed wireless link, means for determining whether to revert to a previous beamforming configuration for the directionally-beamformed wireless link based on the exploratory link quality, and means for sending a frame comprising a rollback notification for the directionally-beamformed wireless link in response to a determination to revert to the previous beamforming configuration.

Example 98 is the wireless communication apparatus of Example 97, comprising means for determining whether to revert to the previous beamforming configuration for the directionally-beamformed wireless link by comparing a link quality associated with the previous beamforming configuration to the exploratory link quality associated with the exploratory beamforming configuration.

Example 99 is the wireless communication apparatus of Example 97, comprising means for initiating an exploratory beamforming training procedure, the exploratory beamforming training procedure to comprise generating the exploratory beamforming configuration for the directionally-beamformed wireless link.

Example 100 is the wireless communication apparatus of Example 99, comprising means for initiating the exploratory beamforming training procedure by sending a sector sweep frame.

Example 101 is the wireless communication apparatus of Example 99, comprising means for initiating the exploratory beamforming training procedure by sending a grant frame.

Example 102 is the wireless communication apparatus of Example 101, the grant frame to comprise a beamforming control field containing a bit set to a value to indicate exploratory beamforming.

Example 103 is the wireless communication apparatus of Example 97, comprising means for receiving a second frame comprising an acknowledgment of the rollback notification for the directionally-beamformed wireless link.

Example 104 is the wireless communication apparatus of Example 103, comprising means for reverting to a previous beamforming configuration for a second directionally-beamformed wireless link in response to a determination that the second frame comprises a rollback notification for the second directionally-beamformed wireless link.

Example 105 is the wireless communication apparatus of Example 103, the sent frame to comprise the rollback notification for the directionally-beamformed wireless link and a rollback notification for a second directionally-beamformed wireless link, the received second frame to comprise the acknowledgment of the rollback notification for the directionally-beamformed wireless link and an acknowledgment of the rollback notification for the second directionally-beamformed wireless link.

Example 106 is the wireless communication apparatus of Example 97, the frame to comprise a sector sweep feedback frame.

Example 107 is the wireless communication apparatus of Example 106, the rollback notification to comprise a rollback bit in a field of the sector sweep feedback frame.

Example 108 is the wireless communication apparatus of Example 107, the field to comprise a Sector Sweep (SSW) Feedback field of the sector sweep feedback frame.

Example 109 is the wireless communication apparatus of Example 108, the rollback bit to comprise a B22 bit or a B23 bit of the SSW Feedback field.

Example 110 is the wireless communication apparatus of Example 97, the frame to comprise a beam refinement frame.

Example 111 is the wireless communication apparatus of Example 110, the rollback notification to comprise a rollback bit in an element of the beam refinement frame.

Example 112 is the wireless communication apparatus of Example 111, the element to comprise a Directional Multi-Gigabit (DMG) Beam Refinement element of the beam refinement frame.

Example 113 is the wireless communication apparatus of Example 112, the rollback bit to comprise a B54 bit or a B55 bit of the DMG Beam Refinement element.

Example 114 is the wireless communication apparatus of Example 97, the frame to comprise a link measurement response frame.

Example 115 is the wireless communication apparatus of Example 114, the rollback notification to comprise a beamforming rollback activity value in a field of the link measurement response frame.

Example 116 is the wireless communication apparatus of Example 115, the field to comprise an Activity field of a Directional Multi-Gigabit (DMG) Link Margin element of the link measurement response frame.

Example 117 is a system, comprising a wireless communication apparatus according to any of Examples 97 to 116 at least one radio frequency (RF) transceiver, and at least one RF antenna.

Example 118 is the system of Example 117, comprising a touchscreen display.

Example 119 is a wireless communication apparatus, comprising means for reverting, at a station (STA), from an exploratory beamforming configuration for a directionally-beamformed wireless link to a previous beamforming configuration for the directionally-beamformed wireless link in response to receipt of a first frame comprising a rollback notification for the directionally-beamformed wireless link, means for sending a second frame comprising an acknowledgment of the rollback notification, and means for communicating over the directionally-beamformed wireless link according to the previous beamforming configuration.

Example 120 is the wireless communication apparatus of Example 119, the first frame to comprise a rollback notification for a second directionally-beamformed wireless link, the second frame to comprise an acknowledgment of the rollback notification for the second directionally-beamformed wireless link.

Example 121 is the wireless communication apparatus of Example 119, comprising means for determining whether to revert to a previous beamforming configuration for a second directionally-beamformed wireless link based on an exploratory link quality associated with an exploratory beamforming configuration for the second directionally-beamformed wireless link.

Example 122 is the wireless communication apparatus of Example 121, comprising means for including a rollback notification for the second directionally-beamformed wireless link in the second frame in response to a determination to revert to the previous beamforming configuration for the second directionally-beamformed wireless link.

Example 123 is the wireless communication apparatus of Example 119, the first frame to comprise a sector sweep feedback frame, the second frame to comprise a sector sweep acknowledgment frame.

Example 124 is the wireless communication apparatus of Example 119, the first and second frames to comprise beam refinement frames.

Example 125 is the wireless communication apparatus of Example 124, comprising means for using a first rollback bit of the second beam refinement frame to acknowledge the rollback notification comprised in the first beam refinement frame, and means for using a second roll back bit of the second beam refinement frame to provide a rollback notification for a second directionally-beamformed wireless link.

Example 126 is the wireless communication apparatus of Example 119, the second frame to comprise a directional multi-gigabit (DMG) link acknowledgment element comprising a beamforming rollback activity value set to acknowledge the rollback notification for the directionally-beamformed wireless link.

Example 127 is a system, comprising a wireless communication apparatus according to any of Examples 119 to 126, at least one radio frequency (RF) transceiver, and at least one RF antenna.

Example 128 is the system of Example 127, comprising a touchscreen display.

Numerous specific details have been set forth herein to provide a thorough understanding of the embodiments. It will be understood by those skilled in the art, however, that the embodiments may be practiced without these specific details. In other instances, well-known operations, compo- Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
a station (STA) comprising logic, at least a portion of which is in hardware, the logic to:
identify an exploratory link quality associated with an exploratory beamforming configuration for a directionally-beamformed wireless link,
determine whether to revert to a previous beamforming configuration for the directionally-beamformed wireless link by comparing a link quality associated with the previous beamforming configuration to the exploratory link quality associated with the exploratory beamforming configuration,
in response to a determination to revert to the previous beamforming configuration, send a frame comprising a rollback notification for the directionally-beamformed wireless link,
receive a second frame comprising an acknowledgment of the rollback notification for the directionally-beamformed wireless link; and
revert to a previous beamforming configuration for a second directionally-beamformed wireless link in response to a determination that the second frame comprises a rollback notification for the second directionally-beamformed wireless link.

2. The apparatus of claim 1, the logic to initiate an exploratory beamforming training procedure, the exploratory beamforming training procedure to comprise generating the exploratory beamforming configuration for the directionally-beamformed wireless link.

3. The apparatus of claim 2, the logic to initiate the exploratory beamforming training procedure by sending a sector sweep frame.

4. The apparatus of claim 2, the logic to initiate the exploratory beamforming training procedure by sending a grant frame.

5. The apparatus of claim 4, the grant frame to comprise a beamforming control field containing a bit set to a value to indicate exploratory beamforming.

6. The apparatus of claim 1, comprising:
at least one radio frequency (RF) transceiver; and
at least one RF antenna.

7. An apparatus, comprising:
a station (STA) comprising logic, at least a portion of which is in hardware, the logic to
revert from an exploratory beamforming configuration for a directionally-beamformed wireless link to a previous beamforming configuration for the directionally-beamformed wireless link in response to receipt of a first frame comprising a rollback notification for the directionally-beamformed wireless link,
send a second frame comprising an acknowledgment of the rollback notification,
communicate over the directionally-beamformed wireless link according to the previous beamforming configuration, the first frame to comprise a sector sweep feedback frame, and the second frame to comprise a sector sweep acknowledgement frame, determine whether to revert to a previous beamforming configuration for a second directionally-beamformed wireless link based on an exploratory link quality associated with an exploratory beamforming configuration for the second directionally-beamformed wireless link;

include a rollback notification for the second directionally-beamformed wireless link in the second frame in response to a determination to revert to the previous beamforming configuration for the second directionally-beamformed wireless link.

8. The apparatus of claim 7, the first frame to comprise a rollback notification for a second directionally-beamformed wireless link, the second frame to comprise an acknowledgment of the rollback notification for the second directionally-beamformed wireless link.

9. The apparatus of claim 7, the second frame to comprise a directional multi-gigabit (DMG) link acknowledgment element comprising a beamforming rollback activity value set to acknowledge the rollback notification for the directionally-beamformed wireless link.

10. At least one non-transitory computer-readable medium comprising a set of instructions that, in response to being executed at a station (STA), cause the STA to:
   identify an exploratory link quality associated with an exploratory beamforming configuration for a directionally-beamformed wireless link;
   determine whether to revert to a previous beamforming configuration for the directionally-beamformed wireless link by comparing a link quality associated with the previous beamforming configuration to the exploratory link quality associated with the exploratory beamforming configuration; and
   in response to a determination to revert to the previous beamforming configuration, send a frame comprising a rollback notification for the directionally-beamformed wireless link; wherein the frame comprises a sector sweep feedback frame, the rollback notification to comprise a rollback bit in a Sector Sweep (SSW) Feedback field of the sector sweep feedback frame.

11. The at least one non-transitory computer-readable medium of claim 10, comprising instructions that, in response to being executed at the STA, cause the STA to initiate an exploratory beamforming training procedure, the exploratory beamforming training procedure to comprise generating the exploratory beamforming configuration for the directionally-beamformed wireless link.

12. The at least one non-transitory computer-readable medium of claim 10, the frame to comprise a beam refinement frame, the rollback notification to comprise a rollback bit in a Directional Multi-Gigabit (DMG) Beam Refinement element of the beam refinement frame.

13. The at least one non-transitory computer-readable medium of claim 10, the frame to comprise a link measurement response frame, the rollback notification to comprise a beamforming rollback activity value in an Activity field of a Directional Multi-Gigabit (DMG) Link Margin element of the link measurement response frame.

14. The at least one non-transitory computer-readable medium of claim 10, comprising instructions that, in response to being executed at the STA, cause the STA to:
   receive a second frame comprising an acknowledgment of the rollback notification for the directionally-beamformed wireless link; and
   revert to a previous beamforming configuration for a second directionally-beamformed wireless link in response to a determination that the second frame comprises a rollback notification for the second directionally-beamformed wireless link.

15. The at least one non-transitory computer-readable medium of claim 10, comprising instructions that, in response to being executed at the STA, cause the STA to include a rollback notification for a second directionally-beamformed wireless link in the sent frame in response to a determination to revert to a previous beamforming configuration for the second directionally-beamformed wireless link.

* * * * *

UNITED STATES PATENT AND TRADEMARK OFFICE
CERTIFICATE OF CORRECTION

PATENT NO. : 9,998,184 B2
APPLICATION NO. : 14/672117
DATED : June 12, 2018
INVENTOR(S) : Assaf Kasher et al.

It is certified that error appears in the above-identified patent and that said Letters Patent is hereby corrected as shown below:

On the Title Page

In item (72), Column 1, in Inventors, delete "Shfaim" and insert -- Shefayim --, therefor.

Signed and Sealed this
Twenty-first Day of August, 2018

Andrei Iancu
*Director of the United States Patent and Trademark Office*